US007878282B2

(12) United States Patent
Kumazaki et al.

(10) Patent No.: US 7,878,282 B2
(45) Date of Patent: Feb. 1, 2011

(54) CONTROL DEVICE FOR HYBRID VEHICLE

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 391 days.

(21) Appl. No.: 12/007,774

(22) Filed: Jan. 15, 2008

(65) Prior Publication Data
US 2008/0173485 A1 Jul. 24, 2008

(30) Foreign Application Priority Data
Jan. 19, 2007 (JP) ............................. 2007-010844

(51) Int. Cl.
*B60W 10/00* (2006.01)
(52) U.S. Cl. .......................... 180/65.265; 180/65.27; 180/65.285; 180/65.21
(58) Field of Classification Search .............. 180/65.25, 180/65.26, 65.265, 65.285, 65.225, 65.245, 180/65.8, 65.235, 65.21, 65.27; 701/22, 701/84
See application file for complete search history.

(56) References Cited

U.S. PATENT DOCUMENTS

| 5,492,190 | A  | * | 2/1996  | Yoshida ................... 180/65.245 |
| 5,826,671 | A  | * | 10/1998 | Nakae et al. ............ 180/65.235 |
| 6,140,780 | A  | * | 10/2000 | Oshima et al. ........... 180/65.26 |
| 6,330,498 | B2 | * | 12/2001 | Tamagawa et al. ............ 701/22 |
| 6,333,612 | B1 | * | 12/2001 | Suzuki et al. ............ 180/65.26 |
| 6,356,817 | B1 | * | 3/2002  | Abe ............................ 701/22 |
| 6,369,531 | B1 | * | 4/2002  | Oshima et al. ........... 180/65.26 |
| 6,569,055 | B2 | * | 5/2003  | Urasawa et al. ........ 180/65.225 |
| 6,603,278 | B2 | * | 8/2003  | Oshima et al. ............. 701/22 |
| 6,960,152 | B2 | * | 11/2005 | Aoki et al. .................... 477/3 |
| 6,994,652 | B2 | * | 2/2006  | Atarashi et al. ................ 477/3 |
| 7,040,433 | B2 | * | 5/2006  | Yamamoto et al. ..... 180/65.225 |
| 7,100,721 | B2 | * | 9/2006  | Atarashi et al. ........ 180/65.235 |
| 7,117,965 | B2 | * | 10/2006 | Yatabe et al. .......... 180/65.235 |
| 7,198,123 | B2 | * | 4/2007  | Imazu et al. ............. 180/65.25 |
| 7,340,330 | B2 | * | 3/2008  | Okoshi et al. ................ 701/22 |
| 7,540,344 | B2 | * | 6/2009  | Yamamoto et al. ....... 180/65.25 |

FOREIGN PATENT DOCUMENTS

| JP | A 2001-105932 | 4/2001 |
| JP | A 2005-178626 | 7/2005 |
| JP | A 2005-271618 | 10/2005 |
| JP | A 2005-304201 | 10/2005 |
| JP | A 2006-180626 | 7/2006 |

* cited by examiner

*Primary Examiner*—Hau V Phan
(74) *Attorney, Agent, or Firm*—Oliff & Berridge, PLC

(57) ABSTRACT

A control device for hybrid vehicle is provided with property alter means 88 that is operative based on whether or not an EV running mode is set and alters a given property used for determining demanded output torque $T_{OUTt}$ of a transmission mechanism by referring to an accelerator opening Acc. This suppresses occurrence of engine startup to meet a requirement for the EV running mode to be initiated. The property alter means alters the given property such that during an EV running mode turn-on state, demanded output torque $T_{OUTt}$ determined based on the accelerator opening Acc has a lower value than that set for an EV running mode turn-off state. That is, this causes a drop in sensitivity of demanded output torque $T_{OUTt}$ determined based on the accelerator opening Acc. Thus, the occurrence of engine startup induced upon depressive operation of an accelerator pedal during the EV running mode is suppressed.

11 Claims, 11 Drawing Sheets

|      | C1 | C2 | B1 | B2 | B3 | SHIFTING RATIO | STEP |
|------|----|----|----|----|----|----------------|------|
| 1st  | ○  |    |    |    | ○  | 3.357          | 1.54 |
| 2nd  | ○  |    |    | ○  |    | 2.180          | 1.53 |
| 3rd  | ○  |    | ○  |    |    | 1.424          | 1.42 |
| 4th  | ○  | ○  |    |    |    | 1.000          | 1.42 |
| 5th  |    | ○  |    |    |    | 0.705          | TOTAL 4.76 |
| R    |    | ○  |    |    | ○  | 3.209          |      |
| N    |    |    |    |    |    |                |      |

○ ENGAGED

|  | C1 | C2 | B1 | B2 | SHIFTING RATIO | STEP |
|---|---|---|---|---|---|---|
| 1st | ○ |  |  | ○ | 2.804 | 1.54 |
| 2nd | ○ |  | ○ |  | 1.531 | 1.53 |
| 3rd | ○ | ○ |  |  | 1.000 | 1.42 |
| 4th | ○ | ○ |  |  | 0.705 | TOTAL 3.977 |
| R |  | ○ |  | ○ | 2.393 | |
| N |  |  |  |  |  | |

○ ENGAGED

CONTROL DEVICE FOR HYBRID VEHICLE

BACKGROUND OF THE INVENTION

1. Field of the Invention

This invention relates to control device for hybrid vehicle, having an engine and an electric motor, and, more particularly, to a control device for hybrid vehicle for effectuating switching between a motor running mode and an engine running mode.

2. Description of the Related Art

A control device for a hybrid vehicle has heretofore been well known as including an engine and electric motor that enable the switching between a motor running mode relaying on a drive-power source composed of only the electric motor, and engine running mode relaying on another drive-power source mainly composed of the engine.

For instance, Patent Publication 1 (Japanese Patent Application Publication No. 2005-304201) discloses a hybrid vehicle having a control device of such a structure described above. Patent Publication 1 discloses a technology in which the drive-power source includes the engine and electric motor and an EV-running mode is continuously conducted under a situation where during a motor running mode (EV-running mode), a demanded torque command value is less than a given EV-drive permit reference value, whereas when the demanded torque command value exceeds the given EV-drive permit reference value, the engine is started up to carry out the engine running mode.

Besides the foregoing, various technologies have heretofore been known as disclosed in Patent Publication 2 (Japanese Patent Application Publication No. 2005-271618), Patent Publication 3 (Japanese Patent Application Publication No. 2006-180626), Patent Publication 4 (Japanese Patent Application Publication No. 2001-105932) and Patent Publication 5 (Japanese Patent Application Publication No. 2005-178626).

Meanwhile, under a circumstance where a vehicle is traveling on a road around a residential area or the like with a worrisome engine sound in concern, a strong demand conceivably occurs for the motor running mode to be continued for a time period as long as possible. However, if an accelerator pedal is depressed even on at least temporary basis, the demanded torque command value increases during the motor running mode. In this case, it is likely that engine startup occurs regardless of whether a strong or weak requirement is present for the motor running mode to be continued.

SUMMARY OF THE INVENTION

The present invention has been completed with the above views in mind and has an object to provide a control device for a hybrid vehicle, having an engine and electric motor, which can suppress the initiation of engine startup to satisfy a request for a motor running mode to be continued.

To achieve such an object, the invention recited in claim 1, is featured by a control device for a hybrid vehicle (a) including an engine and an electric motor, establishing a motor running state with only the electric motor serving as a drive-power source, and being switched to an engine running state with the engine enabled to serve as a main drive-power source for running the vehicle, if a demanded drive-force relevant value demanded to a vehicle exceeds a given value during the motor running state, the control device (b) comprising property alter means for altering a given property used in determining the demanded drive-force relevant value depending on an output demanded operation amount applied by a driver, by referring to whether or not a motor running mode demanded for the motor running state is set.

With such a structure, the property alter means alters the given property for use in determining the demanded drive-force relevant value depending on the output demanded operation amount applied by the driver, by referring to whether or not the motor running mode demanded for the motor running state to be initiated is set. This suppresses an occurrence of engine startup to meet a demand for the motor running mode to be initiated.

When the motor running mode is set, for instance, the given property can be altered to allow the demanded drive-force relevant value determined based on the output demanded operation amount applied by the driver, to a lower value than the value appearing when no motor running mode is set. This makes it possible to decrease a sensitivity of the drive force relevant value determined based on the output demanded operation amount. As a result, this enables the suppression of engine startup caused by an increase in the output demanded operation amount during the motor running mode.

Preferably, the invention recited in claim 2 is featured by, in the control device for hybrid vehicle recited in claim 1, the property alter means which is operative to alter the given property such that the demanded drive-force relevant value determined based on the output demanded operation amount of the driver in a lower value when the motor running mode is set, than in a value appearing when no motor running mode is set. Such a structure suppresses the occurrence of engine startup caused by the increase in the output demanded operation amount during the motor running mode.

Preferably, the invention recited in claim 3 is featured by, in the control device for hybrid vehicle recited in claim 2, the property alter means which alters the given property, when the motor running mode is set, depending on a vehicle speed relevant value. Such a structure suppresses the occurrence of engine startup in response to a running condition represented by the vehicle speed relevant value. For instance, this allows the given property to be altered such that the demanded drive-force relevant value, determined based on the output demanded operation amount of the driver, decreases with a decrease in the vehicle speed relevant value. This suppresses the occurrence of engine startup during the motor running mode for the vehicle running at a low vehicle speed in a residential area or the like with a worrisome engine sound in concern with an intense demand for the motor running mode to be continued.

Preferably, the invention recited in claim 4 is featured by, in the control device for hybrid vehicle recited in claim 3, the property alter means which alters the given property such that the demanded drive-force relevant value determined based on the output demanded operation amount of the driver decreases with a decrease in the vehicle speed relevant value. Such a structure suppresses the occurrence of engine startup during the motor running mode for the vehicle running at a low vehicle speed in a residential area or the like with a worrisome engine sound in concern with an intense demand for the motor running mode to be continued.

Preferably, the invention recited in claim 5 is featured by, in the control device for hybrid vehicle recited in claim 4, the property alter means which alters the given property such that with increase of the vehicle speed relevant value, the demanded drive-force relevant value determined based on the output demanded operation amount approximates a value of the demanded drive-force relevant value when no motor running mode is set.

With such a structure, even if the motor running mode is set, during the running of the vehicle at a middle and high vehicle speed in an area with an intense demand for power performance to be obtained, power performance can be obtained at an excellent level when no motor running mode is set. That is, the motor running mode can be continuously performed at a low vehicle speed as demanded by the driver, without sacrificing power performance for the vehicle to run at the middle and high vehicle speed.

Preferably, as used herein, the term "drive force relevant value", used for the "demanded drive-force relevant value", refers to a relevant value (equivalent value), corresponding to a vehicle drive force (hereinafter referred to as a "drive force") with the drive wheels acting on for instance the ground surface in the relationship of one to one (1:1), and the drive force is used as the drive force relevant value. In addition to the above, use may be made of for instance torque of a vehicle axle, an output of the vehicle, output torque of a well-known transmission available to transmit a drive force of the drive-power source to the drive wheels, and torque of a propeller shaft.

Preferably, as used herein, the term "output demanded operation amount" refers to a "driver's demand" based on which, for instance, the demanded drive-force relevant value is determined. To this end, use is made of an operation amount of an accelerator device such as an accelerator pedal or a switch, etc.

Preferably, as used herein, the term "vehicle speed relevant value" refers to a relevant value (equivalent value), corresponding to for instance a vehicle speed representing a speed of the vehicle in the relationship of one to one (1:1). Of course, not only the vehicle speed is used to represent the vehicle speed relevant value but also other parameters are used. These may include, for instance, an output rotation speed of a transmission, a rotation speed of a vehicle axle, a rotation speed of a propeller shaft and an output rotation speed of a differential gear device, etc.

DETAILED DESCRIPTION OF THE PREFERRED EMBODIMENTS

Now, various embodiments according to the present invention will be described below in detail with reference to the accompanying drawings.

Embodiment 1

Figures 1, 2:
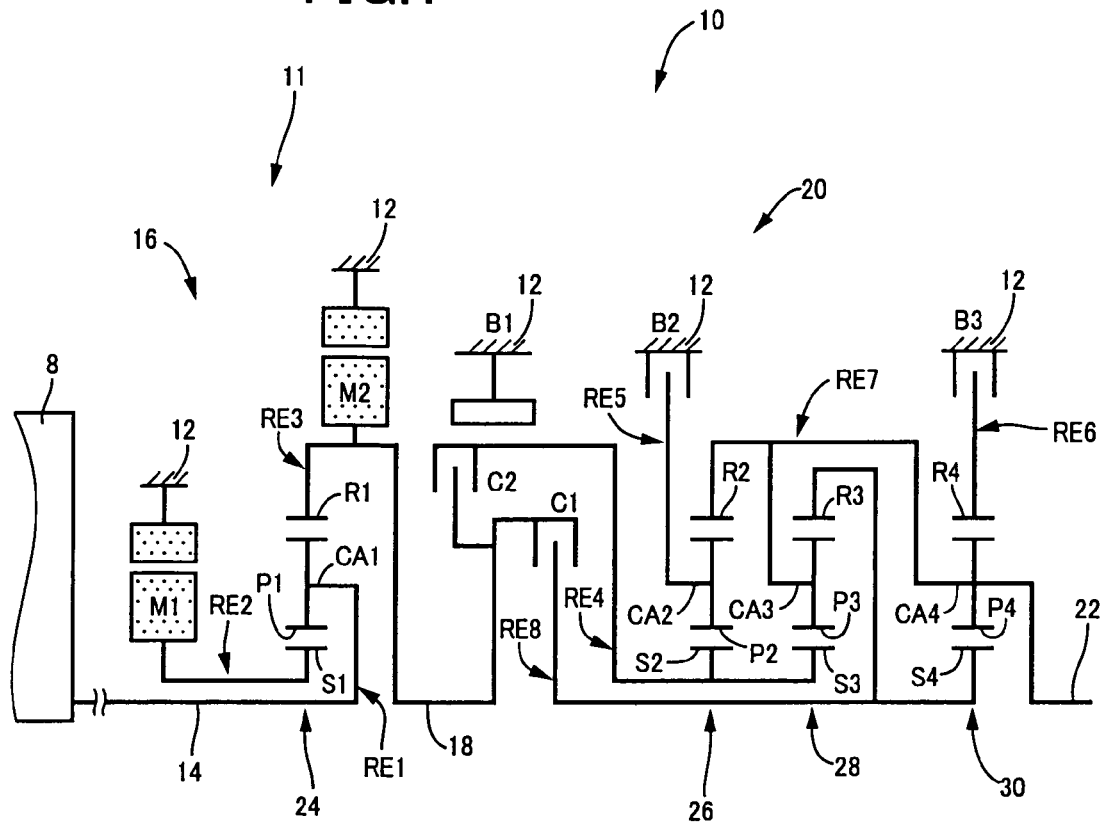
FIG. 1 is a skeleton diagram showing a structure of a drive system of one embodiment according to the present invention for use in a hybrid vehicle.
FIG. 2 is a operation diagram table illustrating combined operations of hydraulically operated frictional coupling devices for use in performing shifting operations in the vehicular drive system shown in FIG. 1.

First embodiment will be explained with reference to FIGS. 1 to 13. FIG. 1 is a skeleton diagram for illustrating a transmission mechanism i.e., shifting mechanism 10 constituting a part of a drive system for a hybrid vehicle to which the present invention is applied. As shown in FIG. 1, the transmission mechanism 10 includes a transmission case 12 (hereinafter referred to as "a case 12") mounted on a vehicle body as a non-rotary member, an input shaft 14 coaxially disposed inside the case 12 as an input rotary member, an electrically controlled differential portion 11 (hereinafter referred to as a "differential portion 11") coaxially connected to the input shaft 14 either directly, or indirectly via a pulsation absorbing damper (vibration damping device) not shown, and serving as a continuously variable transmission portion, an automatic transmission portion i.e., shifting portion 20 connected in series in a power transmitting path between the differential portion 11 and drive wheels 34 (see FIG. 7) through a power transmitting member 18 (power transmitting shaft), and an output shaft 22 connected to the automatic transmission portion 20 and serving as an output rotary member.

The transmission mechanism 10 may be preferably applied to, for instance, an FR (front-engine and reverse-drive) type vehicle and disposed between an engine 8 and a pair of drive wheels 34. The engine 8 includes an internal combustion engine such as a gasoline engine or a diesel engine or the like and serves as a drive-power source, which is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles.

With the transmission mechanism 10 of the present embodiment, the engine 8 and the differential portion 11 are directly connected to each other. As used herein, the term "directly connected to each other" refers to a structure under which a direct connection is established between the associated component parts in the absence of a fluid-operated power transmitting device such as a torque converter or fluid coupling device or the like, and a connection arrangement including, for instance, the pulsation absorbing damper is involved in the meaning of such a direct connection. Since the transmission mechanism 10 includes upper and lower halves formed in a symmetric relation with each other along a central axis, the lower half is omitted from the skeleton diagram of FIG. 1. This similarly applies to the other embodiments of the invention described below.

The differential portion 11 includes a first electric motor M1, a power distributing mechanism 16 in the form of a mechanical mechanism serving as a differential mechanism through which an engine output, applied to the input shaft 14, is mechanically distributed to the first electric motor M1 and the power transmitting member 18, and a second electric motor M2 operatively connected to the power transmitting member 18 for unitary rotation therewith. In the illustrated embodiment, both the first and second electric-motors M1 and M2 are comprised of so-called motor/generators, respectively, each having a function to generate electric power. The first electric motor M1 has at least a function to act as a generator (to generate electric power) for generating a reaction force. The second electric motor M2 has at least a function as a motor (electric motor) to act as a running drive-power source to output a vehicle drive force.

The power distributing mechanism 16 is mainly comprised of a first single-pinion type planetary gear set 24 having a given gear ratio $\rho 1$ in the order of, for instance, approximately "0.418". The first single-pinion type planetary gear set 24 includes rotary elements (hereinafter referred to as "elements") such as a sun gear S1, first planet gears P1, a first carrier CA1 rotatably supporting the planetary gears such that each of the first planet gears P1 is rotatable about its axis while performing an orbital motion, and a first ring gear R1 in meshing engagement with the first sun gear S1 via the first planet gears P1. Assume that the first sun gear S1 has a gear teeth of ZS1 and the first ring gear R1 has a gear teeth of ZR1, the gear ratio $\rho 1$ is expressed as ZS1/ZR1.

In the power distributing mechanism 16, the first carrier CA1 is connected to the input shaft 14, i.e., the engine 8, the first sun gear S1 connected to the first electric motor M1, and the first ring gear R1 connected to the power-transmitting member 18. With the power distributing mechanism 16 of such a structure, the first planetary gear set 24 has the three elements, i.e., the first sun gear S1, the first planetary gear P1, the first carrier CA1 and the first ring gear R1 arranged to rotate relative to each other to be operative for initiating a differential action, i.e., in a differential state under which the differential action is initiated. This allows the output of the engine 8 to be distributed to the first electric motor M1 and the power transmitting mechanism 18. Then, a part of the distributed engine output drives the first electric motor M1 to generate electric energy, which is stored in part in a battery, and used in another part to rotatably drive the second electric motor M2. Thus, the differential portion 11 (power distributing mechanism 16) is caused to function as an electrically operated differential device such that, for instance, the differential portion 11 is placed in a so-called continuously variable shifting state (electrically established CVT state) to rotate the power transmitting member 18 at a continuously varying rate regardless of the engine 8 operating at a given rotation speed. That is, the differential portion 11 functions as an electrically controlled continuously variable transmission to provide a speed ratio $\gamma 0$ (representing rotation speed $N_{IN}$ of the input shaft 14/rotation speed $N_{18}$ of the power transmitting member 18) that is continuously variable from a minimal value $\gamma 0min$ to a maximal value $\gamma 0max$.

The automatic transmission portion 20, structured of a single-pinion type second planetary gear set 26, a single-pinion type third planetary gear set 28 and a single-pinion type fourth planetary gear set 30, is of a planetary gear type multiple-step transmission operative as a step-variable automatic transmission. The second planetary gear set 26 has a second sun gear S2, second planet gears P2, a second carrier CA2 supporting the second planetary gear P2 such that each of the second planet gears P2 is rotatable about its axis and about the axis of the second sun gear S2, and a second ring gear R2 meshing with the second sun gear S2 through the second planet gears P2. For example, the second planetary gear set 26 has a given gear ratio $\rho 2$ of about "0.562".

The third planetary gear set 28 has a third sun gear S3, a third planet gears P3, a third carrier CA3 supporting the third planet gears P3 such that each of the third planet gears P3 is rotatable about its axis and about the axis of the third sun gear S3, and a third ring gear R3 meshing with the third sun gear S3 through the third planet gears P3. For example, the third planetary gear set 28 has a given gear ratio $\rho 3$ of about "0.425". The fourth planetary gear set 30 has a fourth sun gear S4, fourth planet gears P4; a fourth carrier CA4 supporting the fourth planet gears P4 such that each of the fourth planet gear P4 is rotatable about its axis and about the axis of the fourth sun gear S4, and a fourth ring gear R4 meshing with the fourth sun gear S4 through the fourth planet gears P4. For example, the fourth planetary gear set 30 has a given gear ratio $\rho 4$ of, for instance, about "0.421".

Suppose the second sun gear S2, second ring gear R2, third sun gear S3, third ring gear R3, fourth sun gear S4 and fourth ring gear R4 have the numbers of gear teeth represented by ZS2, ZR2, ZS3, ZR3, ZS4 and ZR4, respectively, the gear ratios $\rho 2$, $\rho 3$ and $\rho 4$ are expressed by ZS2/ZR2, ZS3/ZR3, and ZS4/ZR4, respectively.

In the automatic transmission portion 20, the second and third sun gears S2, S3 are integrally connected to each other to be selectively connected to the power transmitting member 18 through a second clutch C2 and selectively connected to the casing 12 through a first brake B1. A second carrier CA2 is selectively connected to the casing 12 through a second brake B2 and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and fourth sun gear S4 are integrally connected to each other and selectively connected to the power transmitting member 18 through the first clutch C1.

Thus, the automatic transmission portion 20 and the differential portion 11 (power transmitting member 18) are selectively connected to each other through the first clutch C1 or the second clutch C2 provided to establish each gear position (shift gear position) in the automatic transmission portion 20. In other words, the first and second clutches C1, C2 function as coupling devices i.e., engaging device operable to place the power transmitting path between the power transmitting member 18 and the automatic transmission portion 20, that is, the power transmitting path between the differential portion 11 (power transmitting member 18) and the drive wheels 34, selectively in one of a power transmitting state in which the vehicle drive force can be transmitted through the power transmitting path, and the power cut-off state in which the vehicle drive force cannot be transmitted through the power transmitting path. That is, with at least one of the first and second clutches C1 and C2 brought into coupling engagement; the power-transmitting path is placed in the power transmitting state. In contrast, uncoupling both the first and second clutches C1 and C2 places the power-transmitting path in the power cut-off state.

In the transmission portion 20, uncoupling an on-uncoupling coupling device while coupling an on-coupling coupling device allows a so-called "clutch-to-clutch" shifting action to be executed for selectively establishing one of the gear positions. This allows a speed ratio γ (representing a ratio of the rotation speed $N_{18}$ of the power transmitting member 18 to the rotation speed $N_{OUT}$ of the output shaft 22) to be obtained in a nearly equal ratio for each gear position. As indicated in the engagement operation table shown in FIG. 2, for instance, coupling the first clutch C1 and third brake B3 allows a 1st-speed gear position to be established at a speed ratio γ1 of approximately, for instance, "3.357". Coupling the first clutch C1 and second brake B2 allows a 2nd-speed gear position to be established at a speed ratio γ2 of approximately, for instance, "2.180" that is less than a value of the gear ratio of the 1st-speed gear position.

With the first clutch C1 and first brake B1 brought into coupling engagement, a 3rd-speed gear position is established at a speed ratio γ3 of, for instance, approximately "1.424" that is less than a value of the gear ratio of the 2nd-gear position. Coupling the first clutch C1 and second clutch C2 allows a 4th-speed gear position to be established at a speed ratio γ4 of, for instance, approximately "1.000" that is less than a value of the gear ratio of the 3rd-gear position.

Coupling the second clutch C2 and third brake B3 allows a reverse-drive gear position (reverse-drive shift position) to be established at a speed ratio γR of, for instance, approximately "3.209" that is intermediate in value between those of the 1st-speed and 2nd-speed gear positions. Further, uncoupling the first and second clutches C1, C2 and first to third brakes B1 to B3 results in a consequence of a neutral state "N". In addition, for the 5th-speed gear position indicated on the operation diagram table shown in FIG. 2, the automatic transmission portion 20 performs the same coupling operations of the coupling devices as those achieved for the 4th-speed gear position.

The first clutch C1, second clutch C2, first brake B1, second brake B2 and third brake B3 (hereinafter collectively referred to as a "clutch C" and "brake B", unless otherwise specified) are comprised of hydraulically operated frictional coupling devices that are often used in a vehicular automatic transmission portion of the related art. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, each of the frictional coupling devices serves to selectively provide a drive connection between associated two component parts between which such a coupling device is interposed.

With the transmission mechanism 10 of such a structure, the differential portion 11, serving as the continuously variable transmission, and the automatic transmission portion 20 constitute a continuously variable transmission as a whole. Further, controlling the differential portion 11 at a fixed speed ratio enables the differential portion 11 and the automatic transmission portion 20 to provide the same structure as that of a step-variable transmission.

More particularly, the differential portion 11 functions as the continuously variable transmission and the automatic transmission portion 20, connected to the differential portion 11 in series, functions as the step-variable transmission, thereby continuously varying a rotation speed (hereinafter referred to as an "input rotation speed of the automatic transmission portion 20"), i.e., a rotation speed of the power transmitting member 18 (hereinafter referred to as a "transmitting-member rotation speed $N_{18}$") input to the automatic transmission portion 20 for at least one gear position "M". This enables the gear position "M" to have a continuously variable range in speed ratio. Accordingly, the transmission mechanism 10 provides an overall speed ratio γT (representing a ratio of the rotation speed $N_{IN}$ of the input shaft 14 to the rotation speed $N_{OUT}$ of the output shaft 22) in a continuously variable range. Thus, the transmission mechanism 10 can establish the continuously variable transmission. The overall speed ratio γT of the transmission mechanism 10 is a total speed ratio γT of the automatic transmission portion 20 as a whole that is established depending the speed ratio γ0 of the differential portion 11 and the speed ratio γ of the automatic transmission portion 20.

For the respective gear positions such as, for instance, the 1st-speed to 4th-speed gear positions of the automatic transmission portion 20 and the reverse-drive gear position as indicated in the engagement operation table shown in FIG. 2, the power-transmitting-member rotation speed $N_{18}$ is continuously variable such that each gear position is obtained in a continuously variable speed range. Accordingly, a speed ratio between the adjacent gear positions becomes infinitely and continuously variable, enabling the total speed ratio γT to be obtained in an infinitely variable range with the transmission mechanism 10 as a whole.

Controlling the differential portion 11 at a fixed speed ratio γ0 and selectively coupling the clutch C and brake B causes either one of the 1st-speed to 4th-speed gear positions or the reverse-drive gear position (reverse-drive shift position) to be selectively established. This allows the transmission mechanism 10 to have the overall speed ratio γT in a nearly equal ratio for each of the gear positions. Thus, the transmission mechanism 10 can be established in the same state as that of the step-variable transmission.

If, for instance, the differential portion 11 is controlled so as to provide the speed ratio γ0 at a fixed value of "1", the transmission mechanism 10 provides the total speed ratio γT for each gear position of the 1st-speed to 4th-speed gear positions and reverse-drive gear position of the automatic transmission portion 20 as indicated by the engagement operation table shown in FIG. 2. Further, if the automatic transmission portion 20 is controlled under the 4th-speed gear position so as to cause the differential portion 11 to have the fixed speed ratio γ0 of approximately, for instance, "0.7" less than a value of "1", the automatic transmission portion 20 has the total speed ratio γT of approximately, for instance, "0.705" that is less than a value of the 4th-speed gear position as indicated by a 5th-speed gear position as indicated by the engagement operation table shown in FIG. 2.

Figure 3:
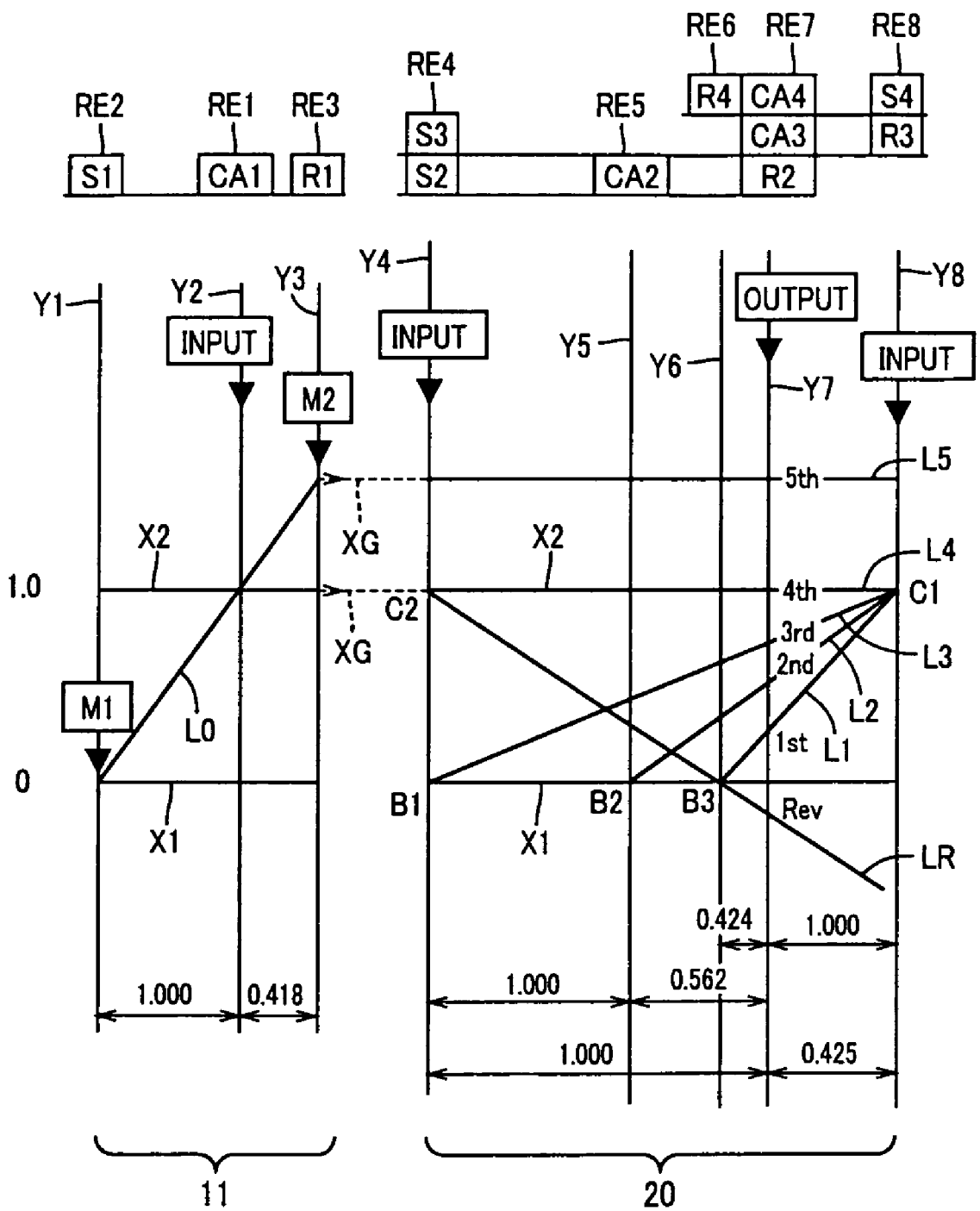
FIG. 3 is a collinear chart indicating mutually relative rotating speeds for various gear positions in the vehicular drive system shown in FIG. 1.

FIG. 3 is a collinear chart for the transmission mechanism 10, including the differential portion 11 and the automatic transmission portion 20, wherein the relative motion relationships among the rotation speeds of the various rotary elements in different coupling states for each gear position can be plotted on straight lines. The collinear chart of FIG. 3 takes the form of a two-dimensional coordinate system having the abscissa axis plotted with the gear ratios ρ of the planetary gear sets 24, 26, 28, 30 and the ordinate axis plotted with the mutually relative rotating speeds of the rotary elements. Among transverse lines, a transverse line X1 on a lower area indicates a rotation speed laying at a zeroed level; a transverse line X2 on an upper area indicates a rotation speed of "1.0", that is, a rotating speed $N_E$ of the engine 8 connected to the input shaft 14; and a transverse line XG indicates a rotation speed of the power transmitting member 18.

Starting from the left in sequence, three vertical lines Y1 to Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Starting from the left in sequence, further, five vertical lines Y4 to Y8 for the automatic transmission portion 20 represent the mutually relative rotating speeds of: the second and third sun gears S2, S3, corresponding to a fourth rotary element (fourth element) RE4 and connected to each other; the second carrier CA2 corresponding to a fifth rotary element (fifth element) RE5; the fourth ring gear R4a corresponding to a sixth rotary element (sixth element) RE6; the second ring gear R2, third carrier CA3 and fourth carrier CA4 corresponding to a seventh rotary element (seventh element) RE7 and connected to each other; and the third ring gear R3 and fourth sun gear S4 corresponding to an eighth rotary element (eighth element) RE8, respectively, and connected to each other. Each distance between the adjacent vertical lines is determined based on the gear ratios ρ2, ρ3 and ρ4 of the second, third and fourth planetary gear sets 26, 28, 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ1. For the automatic transmission portion 20, further, a space between the sun gear and carrier is set to a distance corresponding to a value of "1" for each of the second, third and fourth planetary gear sets 26, 28, 30 with the space between the carrier and ring gear being set to the distance corresponding to the gear ratio ρ1.

To describe the transmission mechanism 10 with reference to the collinear chart of FIG. 3, with the power distributing mechanism 16 (differential portion 11), the first rotary element RE1 (first carrier CA1) of the first planetary gear set 24 is connected to the input shaft 14, i.e., the engine 8. The second rotary element RE2 is connected to the first electric motor M1. The third rotary element RE3 (first ring gear R1) is connected to the power transmitting member 18 and second electric motor M2. Thus, the transmission mechanism 10 is structured so as to allow the input shaft 14 to transmit (input) a rotary motion to the automatic transmission portion 20 through the power transmitting member 18. With such a structure, the relationship between the rotation speeds of the first sun gear S1 and the first ring gear R1 is represented by an inclined straight line L0 which passes across a point of intersection between the lines Y2 and X2.

Now, description is made of a case in which, for example, the differential portion 11 is placed in a differential state with the first to third rotary elements RE1 to RE3 enabled to rotate relative to each other and the rotation speed of the first ring gear R1, indicated at an intersecting point between the straight line L0 and the vertical line Y3, is bound with the vehicle speed V and remains at a nearly constant level. In this case, as the rotation speed of the first electric motor M1 is controlled to raise or lower the rotation speed of the first sun gear S1 indicated at an intersecting point between the straight line L0 and the vertical line Y1, the rotation speed of the first carrier CA1, i.e., the engine rotation speed $N_E$, indicated by an intersecting pint between the straight line L0 and the vertical line Y2, is raised or lowered.

By controlling the rotation speed of the first electric motor M1 so as to cause the speed ratio γ0 of the differential portion 11 to be fixed at "1", the first sun gear S1 rotates at the same speed as the engine rotation speed $N_E$. Then, the straight line L0 is aligned with the horizontal line X2 and the first ring gear R1, i.e., the power transmitting member 18, is caused to rotate at the same speed as the engine rotation speed $N_E$. On the contrary, if the rotation speed of the first electric motor M1 is controlled so as to allow the differential portion 11 to have the speed ratio γ0 of approximately, for instance, "0.7" less than a value less than "1". This causes the rotation speed of the first sun gear S1 to be zeroed. Then, the straight line L0 assumes a state shown in FIG. 3 in which the power-transmitting member rotation speed $N_{18}$ increases to a higher level than the engine rotation speed $N_E$.

With the automatic transmission portion 20, the fourth rotary element RE4 is selectively connected to the power transmitting member 18 via the second clutch C2 and selectively connected to the casing 12 via the first brake B1. The fifth rotary element RE5 is selectively connected to the casing 12 via the second brake B2. The sixth rotary element RE6 is selectively connected to the casing 12 via the third brake B3. The seventh rotary element RE7 is connected to the output shaft 22 and the eighth rotary element RE8 is selectively connected to the power transmitting member 18 via the first clutch C1.

In the automatic transmission portion 20, the differential portion 11 is placed in a state with the straight line L0 brought into coincidence with the horizontal line X2. In this moment, the differential portion 11 transfers the vehicle drive force to the eighth rotary element RE8 at the same speed as the engine rotation speed $N_E$. Then, as the first clutch C1 and third brake B3 are coupled, the rotation speed of the output shaft 22 is indicated for the 1st-speed gear position. This is represented by an intersecting point between the inclined line L1, passing across an intersecting point between the vertical line Y8, indicative of the rotation speed of the eighth rotary element RE8, and the horizontal line X2 and a point of intersection between the vertical line Y6, indicative of the rotation speed of the sixth rotary element RE6, and the horizontal line. X1, and an intersecting point intersecting the vertical line Y7 indicative of the rotation speed of the seventh rotary element RE connected to the output shaft 22 as indicated in FIG. 3.

Similarly, the rotation speed of the output shaft 22 is indicated for the 2nd-speed gear position as represented by an intersecting point between an inclined straight line L2, determined when the first clutch C1 and second brake B2 are coupled, and the vertical line Y7 indicative of the rotation speed of the seventh rotary element RE7 connected to the output shaft 22. The rotation speed of the output shaft 22 is indicated for the 3rd-speed gear position as represented by an intersecting point between an inclined straight line L3, determined when the first clutch C1 and first brake B1 are coupled, and the vertical line Y7 indicative of the rotation speed of the seventh rotary element RE7 connected to the output shaft 22. The rotation speed of the output shaft 22 is indicated for the 4th-speed gear position as represented by an intersecting point between a horizontal straight line L4, determined with the first clutch C1 and second clutch C2 being coupled, and the vertical line Y7 indicative of the rotation speed of the seventh rotary element RE7 connected to the output shaft 22.

With the differential portion 11, if the straight line L0 is caused to assume a position shown in FIG. 3, the differential portion 11 transmits the rotary motion to the eighth rotary element RE8 at a rotation speed higher than the engine rotation speed $N_E$. Under such a state, as shown in FIG. 3, the rotation speed of the output shaft 22 is indicated for the 5th-speed gear position as represented by an intersecting point between a horizontal straight line L5 determined with the first and second clutches C1, C2 being coupled, and the vertical line Y7 indicative of the rotation speed of the seventh rotary element RE7 connected to the output shaft 22.

Figure 4:
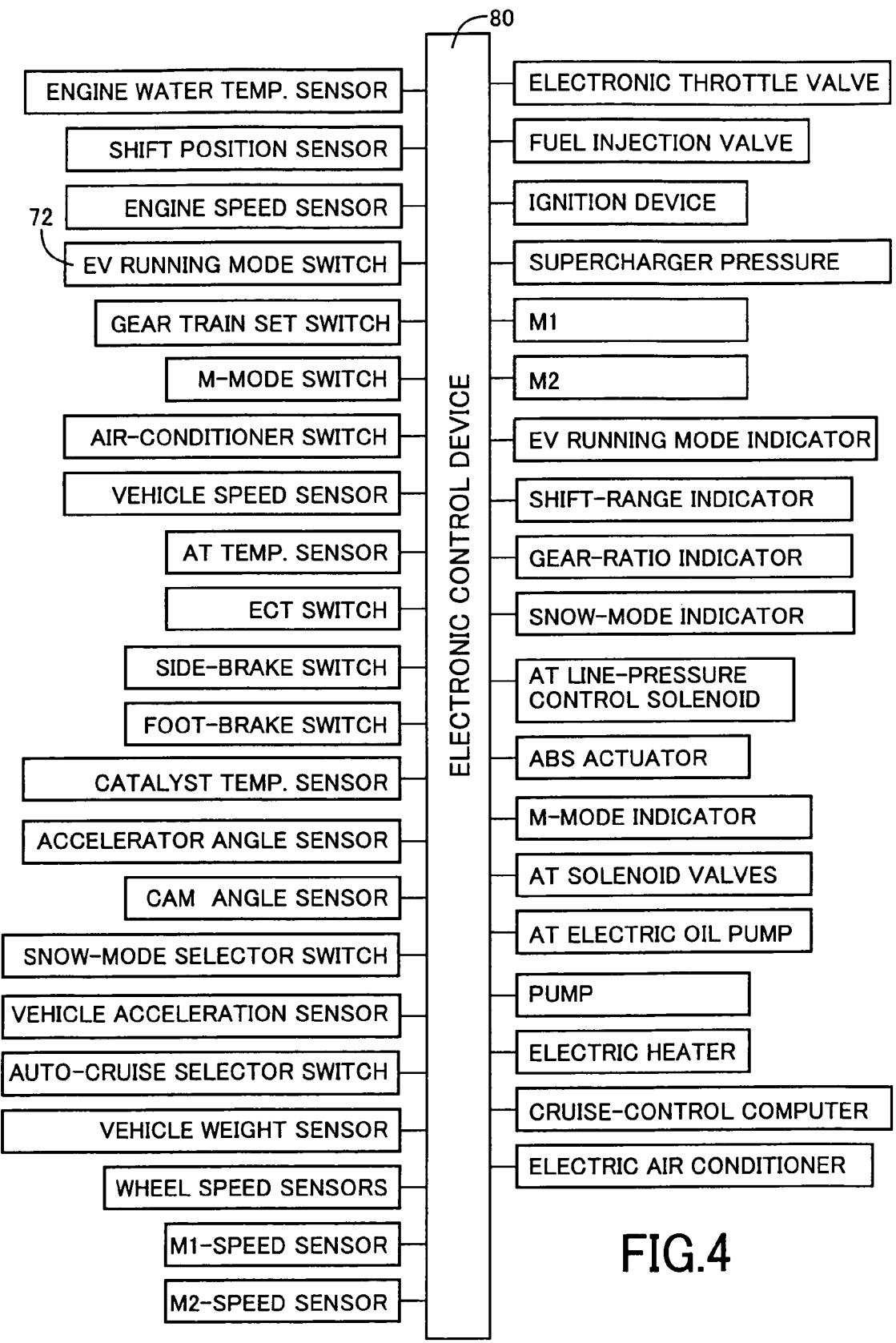
FIG. 4 is a view illustrating an electronic control unit with input and output signals associated therewith which is provided in the vehicular drive system shown in FIG. 1.

FIG. 4 shows an electronic control unit 80, operative to control the transmission mechanism 10 of the present invention, which is applied with various input signals and outputs various signals in response thereto. The electronic control unit 80 includes a so-called microcomputer incorporating a CPU, a ROM, a RAM and an input/output interface. The microcomputer processes the signals according to programs stored in the ROM while utilizing a temporary data storage function of the ROM, thereby implementing hybrid drive controls of the engine 8 and electric motors M while executing drive controls such as shifting controls of the automatic transmission portion 20.

The electronic control unit 80, connected to various sensors and switches as shown in FIG. 4, receives various signals including a signal indicative of an engine coolant temperature $TEMP_W$, a signal indicative of a shift position $P_{SH}$ and a signal indicative of the number of operations initiated on an "M" position of a shift lever 52 (see FIG. 6), a signal indicative of the engine rotation speed $N_E$ representing the rotation speed of the engine 8, a signal indicative of the presence or absence of a switching operation initiated for setting a motor drive (EV drive) mode, a signal indicative of a gear train preset value, a signal commanding an M mode (manual shift running mode); a signal indicative of an air conditioner being turned on, a signal indicative of the vehicle speed V corresponding to the rotation speed (hereinafter referred to as "output shaft rotation speed") $N_{OUT}$ of the output shaft 22, a signal indicative of a temperature $T_{OIL}$ of working oil of the automatic transmission portion 20, a signal indicative of a side brake under operation, a signal indicative of a foot brake under operation, and a signal indicative of a foot brake being actuated.

The various signals further includes a signal indicative of a temperature of a catalyst, a signal indicative of an accelerator opening Acc representing an operating stroke of an accelerator pedal corresponding to an output demanded operation amount intended by a driver, a signal indicative of a cam angle, a signal indicative of a snow mode being set, a signal indicative of a fore and aft acceleration value G of the vehicle, a signal indicative of an auto-cruising running mode, a signal indicative of a weight (vehicle weight) of the vehicle, a signal indicative of a wheel velocity of each drive wheel, a signal indicative of a rotation speed $N_{M1}$ of the first electric motor M1 (hereinafter referred to as "first-motor rotation speed $N_{M1}$), a signal indicative of a rotation speed $N_{M2}$ of the second electric motor M2 (hereinafter referred to as "second-motor rotation speed $N_{M2}$), and a signal indicative of a state of charge (charged state) SOC of a battery 60 (see FIG. 7), etc.

Meanwhile, the electronic control unit 80 generates various output signals to be applied to an engine output control device 58 (see FIG. 7) for controlling an output of the engine 8. These output signals include, for instance, a drive signal to be applied to a throttle actuator 64 for controlling a throttle valve opening $\theta_{TH}$ of an electronic throttle valve 62 disposed in an intake manifold 60 of the engine 8, a fuel supply quantity signal to be applied to a fuel injecting device 66 for controlling an amount of fuel injected into the intake manifold 60 or cylinders of the engine 8, and an ignition signal to be applied to an ignition device 68 to control the ignition timing of the engine 8.

The output signals further include, for instance, a supercharger pressure regulation signal for regulating a supercharger pressure of the engine 8, command signals for commanding the operations of the electric motors M, an EV running mode display signal providing a display that an EV running mode is set, a shift-position (manipulated position) display signal for actuating a shift-range indicator, a gear-ratio display signal for displaying the gear ratio, and a snow-mode display signal for displaying the presence of a snow-mode.

In addition, the output signals include, for instance, an ABS actuation signal for actuating an ABS actuator to preclude slippages of the drive wheels during a braking phase, an M-mode display signal for displaying the M-mode being selected, valve command signals for actuating electromagnetic valves (linear solenoid valves), incorporated in the hydraulic control unit 70 (see FIGS. 5 and 7) for controlling the hydraulic actuators of the hydraulically operated frictional coupling devices of the differential portion 11 and automatic transmission portion 20, a signal for causing regulator valves (pressure regulator valves), incorporated in the hydraulic control unit 70, to regulate a line pressure $P_L$, a drive command signal for actuating an electrically driven hydraulic pump acting as a hydraulic original-pressure source for the line pressure $P_L$ to be regulated, a signal applied to a cruise control computer, and an electric air-conditioner drive signal for driving an electric air-conditioner, etc.

Figure 5:
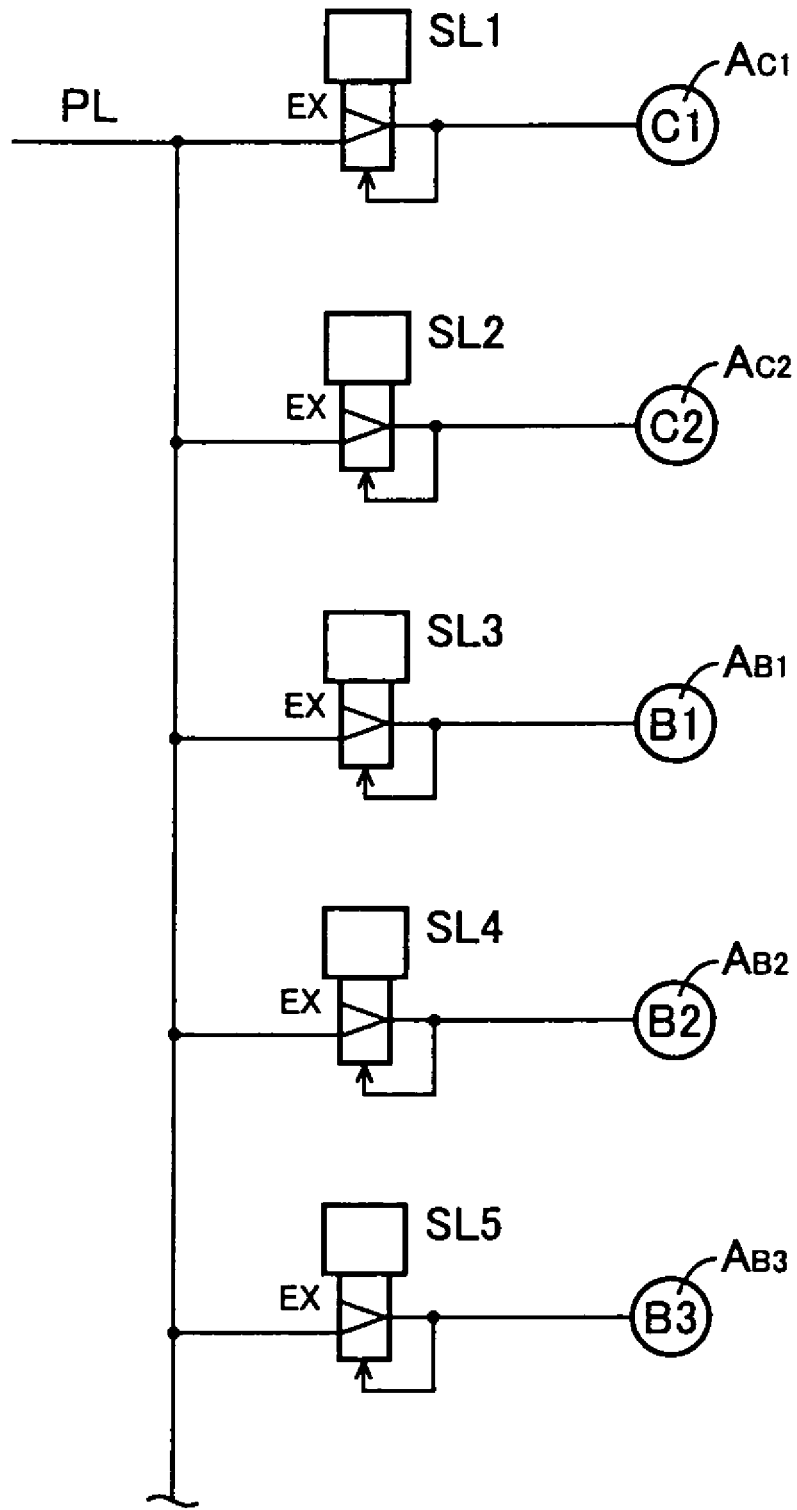
FIG. 5 is a circuit diagram related to linear solenoid valves for controlling operations of various hydraulic actuators of clutches C1, C2 and brakes B1 to B3 of a hydraulic control circuit.

FIG. 5 is a circuit diagram related to linear solenoid valves SL1 to SL5 of the hydraulic control circuit 70 for controlling the operations of respective hydraulic actuators (hydraulic cylinders) AC1 and AC2 and AB1 to AB3 of the clutches C1, C2 and brakes B1 to B3.

In FIG. 5, the line pressure $P_L$ is applied to the respective linear solenoid valves SL1-SL5, connected to hydraulic actuators AC1 and AC2 and AB1 to AB3, respectively. These linear solenoids are controlled in response to command signals delivered from the electronic control unit 80, thereby regulating the line pressure PL into respective clutch engaging pressures PC1 and PC2 and PB1 to PB3 which in turn are directly supplied to the respective hydraulic actuators AC1 and AC2 and AB1 to AB3. The original hydraulic pressure, generated by the electrical oil pump (not shown) or a mechanical oil pump rotatably driven by the engine 30, is regulated by, for instance, a relief-type pressure regulator valve to adjust the line pressure $P_L$ depending on a load of the engine 8 or the like represented in terms of the accelerator opening or throttle valve opening.

The linear solenoid valves SL1 to SL5, fundamentally formed in identical structures, are independently energized or de-energized with the electronic control unit 80. This allows the hydraulic actuators AC1 and AC2 and AB1 to AB3 to independently and controllably regulate respective hydraulic pressures, thereby controlling the clutch engaging pressures PC1 and PC2 and PB1 to PB3 for the clutches C1, C2 and brakes B1 to B3.

With the automatic transmission portion 20, predetermined coupling devices are coupled in a manner as indicated on, for instance, the engagement operation table shown in FIG. 2, thereby establishing various gear positions. In addition, during the shifting control of the automatic transmission portion 20, a so-called clutch-to-clutch shifting is executed to simultaneously control the coupling or uncoupling states of the clutches C and brakes B relevant to the shifting operations.

Figure 6:
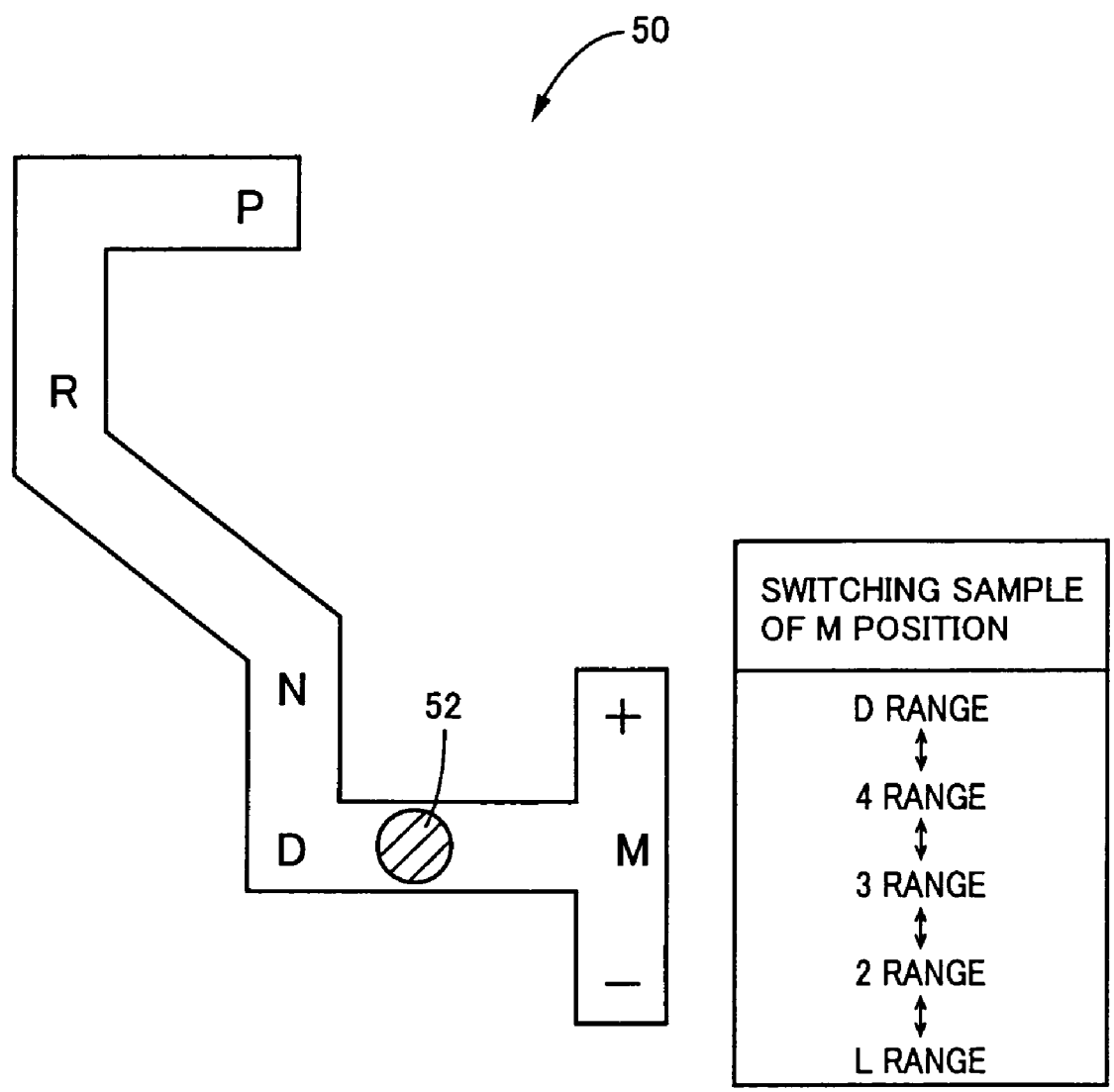
FIG. 6 is a view showing one example of a shift operation device having a shift lever operative to select one of a plurality of shift positions of multiple kinds.

FIG. 6 is a view showing one example of a shift operation device 50 serving as a changeover device operative to select one of shift positions $P_{SH}$ multiple kinds on manual operation. The shift operation device 50 is mounted in, for instance, an area lateral to a driver's seat and includes a shift lever 52 to be manipulated for selecting one of the multiple shift positions $P_{SH}$.

The shift lever 52 has a structure to manually select one of a parking position "P (Parking)", a reverse drive position "R (Reverse)", a forward-drive automatic running position "D (Drive)" and a forward-drive manual-shift position "M (Manual)". In the Parking, an inside of the transmission mechanism 10, i.e., the power transmitting path inside the automatic transmission portion 20 is shut off in a neutral condition, i.e., a neutral state with the output shaft 22 of the automatic transmission portion 20 remained under a locked state. In the Reverse, a neutral position "N (Neutral)" under which the power-transmitting path inside the transmission mechanism 10 is shut off under the neutral state.

In the Drive, an automatic shift mode is initiated within a varying range of a shiftable total speed ratio γT of the transmission mechanism 10 to be obtained with various gear positions attained on the automatic shift control performed in an infinitely variable speed ratio range of the differential portion 11 upon the establishment of the automatic shift mode and a range of the 1st-speed to the 4th-speed gear positions of the automatic transmission portion 20. In the Manual, a manual-shift running mode (manual mode) is established to set a so-called shift range to limit a shift gear position on a high speed range during the operation of the automatic transmission portion 20 under the automatic shift control.

As the shift lever 52 is shifted to the various shift positions $P_{SH}$, for instance, the hydraulic control circuit 70 is electrically switched in conjunction with the manual operation of the shift lever 52, thereby establishing the reverse-drive gear position "R", the neutral position "N" and the various gear positions of the forward-drive gear position "D".

Among the respective shift positions $P_{SH}$ indicated by the "P" to "M" positions, the "P" and "N" positions represent non-running positions, selected when no vehicle is intended to run, under which both the first and second clutches C1, C2 are uncoupled as indicated in, for instance, the engagement operation table shown in FIG. 2. That is, the non-running positions represent non-drive positions enabling the first and second clutches C1, C2 to be selected to place the power transmitting path in a power cut-off state such that the power transmitting path of the automatic transmission portion 20 is shut off to disenable the driving of the vehicle.

The "R", "D" and "M" positions represent running positions selected when the vehicle is caused to run. That is, at least one of the first and second clutches C1, C2 is coupled as indicated in, for instance, the engagement operation table shown in FIG. 2. That is, these running positions represent drive positions under which the first and/or second clutches C1, C2 are selected to switch the power transmitting path to a power transmitting state such that the power transmitting path of the automatic transmission portion 20 is connected to enable the driving of the vehicle.

More particularly, the shift lever 52 is manually shifted from the "P" position or "N" position to the "R" position. This causes the second clutch C2 to be coupled causing the power transmitting path of the automatic transmission portion 20 to be switched from the power cut-off state to the power transmitting state. With the shift lever 52 manually shifted from the "N" position to the "D" position, at least the first clutch C1 is coupled to switch the power transmitting path of the automatic transmission portion 20 from the power cut-off state to the power transmitting state.

With the shift lever 52 manually shifted from the "R" position to the "P" or "N" position, the second clutch C2 is uncoupled to switch the power transmitting path of the automatic transmission portion 20 from the power transmitting state to the power cut-off state. With the shift lever 52 manually shifted from the "D" position to the "N" position, the first and second clutches C1, C2 are uncoupled to switch the power transmitting path of the automatic transmission portion 20 from the power transmitting state to the power cut-off state.

Figure 7:
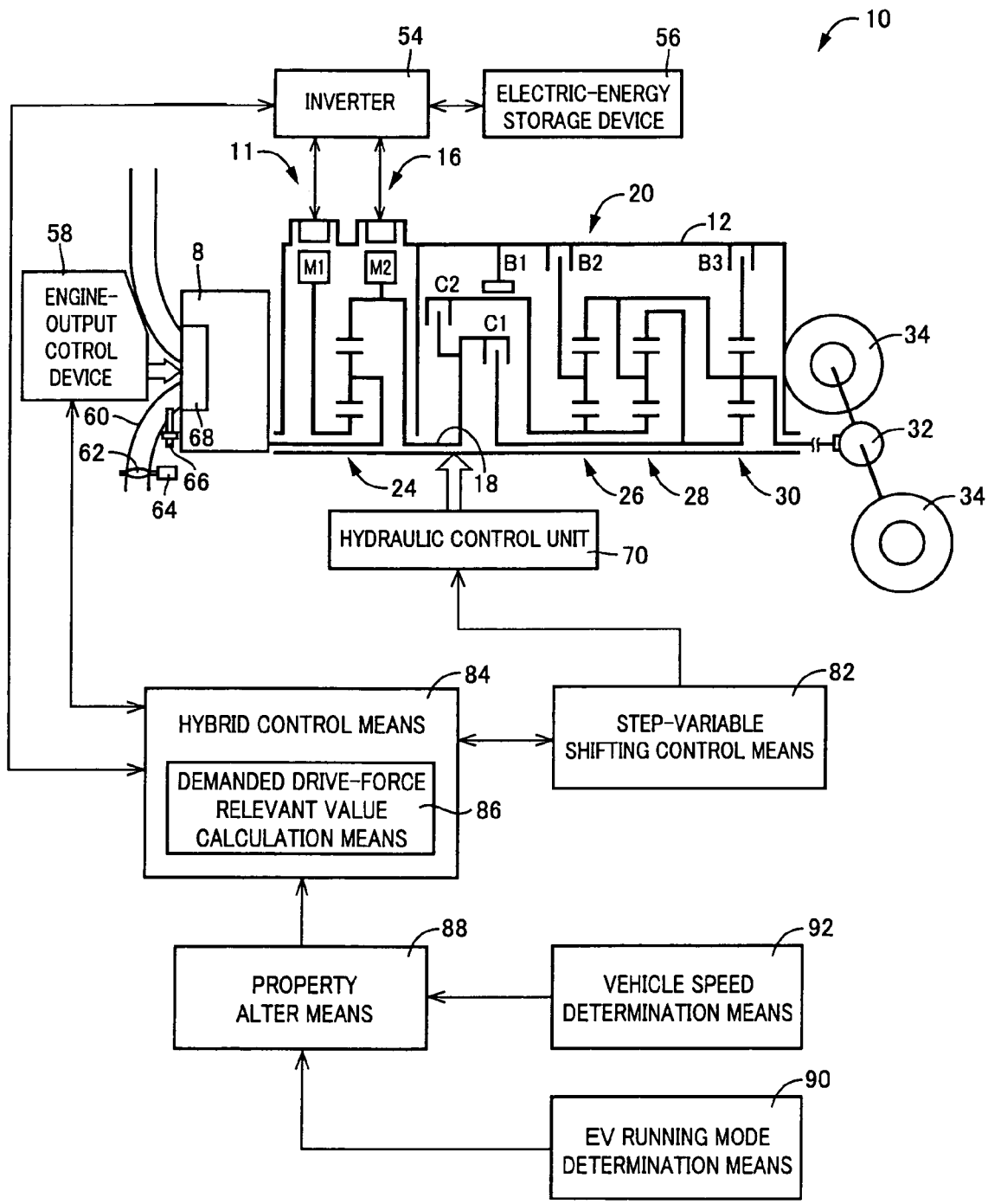
FIG. 7 is a functional block diagram illustrating major control functions of the electronic control unit of FIG. 4.
Figure 8:
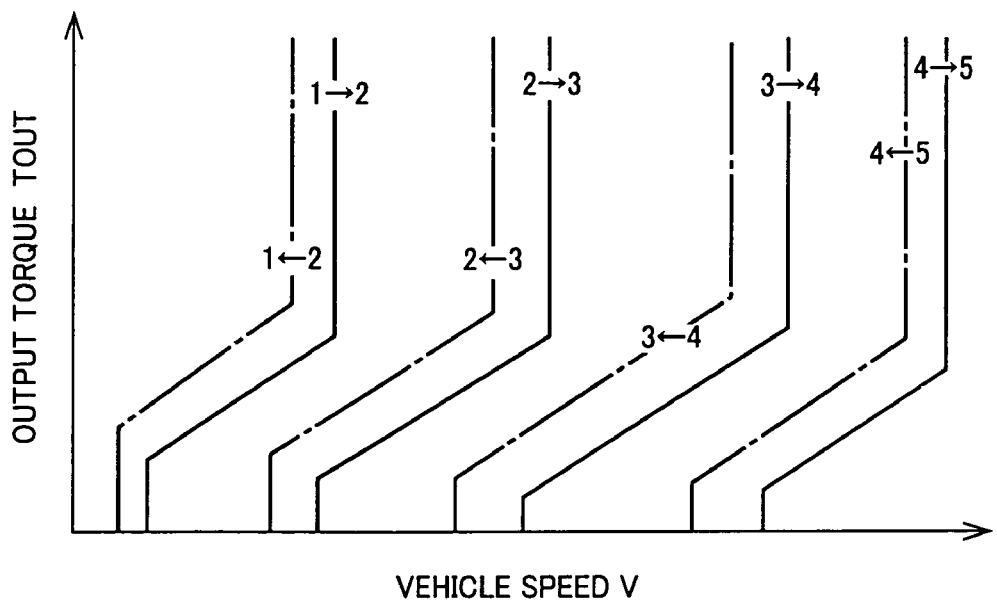
FIG. 8 is a view illustrating one example of a shifting map for use in performing a shifting control of the drive system.

FIG. 7 is a functional block diagram illustrating major control functions to be executed by the electronic control unit 80. In FIG. 7, step-variable shift control means 82 determines whether to execute a shifting, i.e., a gear position to be shifted in the automatic transmission portion 20 based on a vehicle condition by referring to the relationships (shifting lines and shifting map) shown in FIG. 8. Then, the automatic transmission portion 20 is caused to execute the automatic shift control so as to establish a gear position resulting from the determination. Also, FIG. 8 shows upshift lines (in solid lines) and downshift lines (in single dot lines) that are preliminarily stored in terms of parameters such as the vehicle speed V and output torque $T_{OUT}$ of the automatic transmission portion 20. The vehicle condition is represented with an actual vehicle speed V and demanded output torque $T_{OUT}$ of the transmission mechanism 10.

When this takes place, the step-variable shift control means 82 outputs commands (a shift output command and a hydraulic pressure command) to the hydraulic control circuit 70 for operating the hydraulically operated frictional coupling devices, involved in the shifting of the automatic transmission portion 20, in coupling i.e., engaged and/or uncoupling i.e., disengaged or released states so as to establish the gear positions in accordance with the engagement operation table shown in FIG. 2. These commands include a command for uncoupling on-uncoupling side coupling devices involved in the shifting of the automatic transmission portion 20, and a command for coupling on-coupling side coupling devices to cause the clutch-to-clutch shifting to be executed. Upon receipt of such commands, the hydraulic control circuit 70 actuates the linear solenoid valves SL of the hydraulic control circuit 70 so as to uncouple, for instance, the on-uncoupling coupling devices, involved in the shifting of the automatic transmission portion 20, while coupling the on-coupling coupling devices for thereby executing the shifting of the automatic transmission portion 20.

Hybrid control means 84 controls a speed ratio γ0 of the differential portion 11 actuating as an electrically controlled continuously variable transmission. That is, the hybrid control means 84 causes the engine 8 to operate in an operating range at a high efficiency while causing the drive forces of the engine 8 and the second electric motor M2 to be distributed at optimal rates and causing a reacting force of the first electric motor M1 to optimally vary during the operation thereof to generate electric power. At a vehicle speed V during the running of the vehicle in one occasion, for instance, the hybrid control means 84 calculates a target (demanded) output for the vehicle based on the accelerator opening Acc representing the output demanded operation amount intended by the driver, thereby calculating a demanded total target output based on the target output of the vehicle and a battery charge demanded value. In this moment, a target engine output is calculated in consideration of a loss in power transmission, loads of auxiliary units, assist torque of the second electric motor M2 or the like so as to obtain the total target output. Then, the hybrid control means 84 controls the engine 8, while controlling a rate of driving the first electric motor M1 to generate electric power, so as to obtain the engine rotation speed $N_E$ and engine torque $T_E$ such that the target engine output is obtained.

The hybrid control means 84 executes such controls in consideration of, for instance, the gear position of the automatic transmission portion 20 with a view to increasing a dynamic performance and improving fuel consumption. During such hybrid controls, the differential portion 11 is caused to function as the electrically controlled continuously variable transmission such that the engine rotation speed $N_E$ and vehicle speed V, determined for the engine 8 to operate in the operating range at a high efficiency, match the rotation speed of the power transmitting member 18 determined with the vehicle speed V and gear position of the automatic transmission portion 20.

Figure 9:
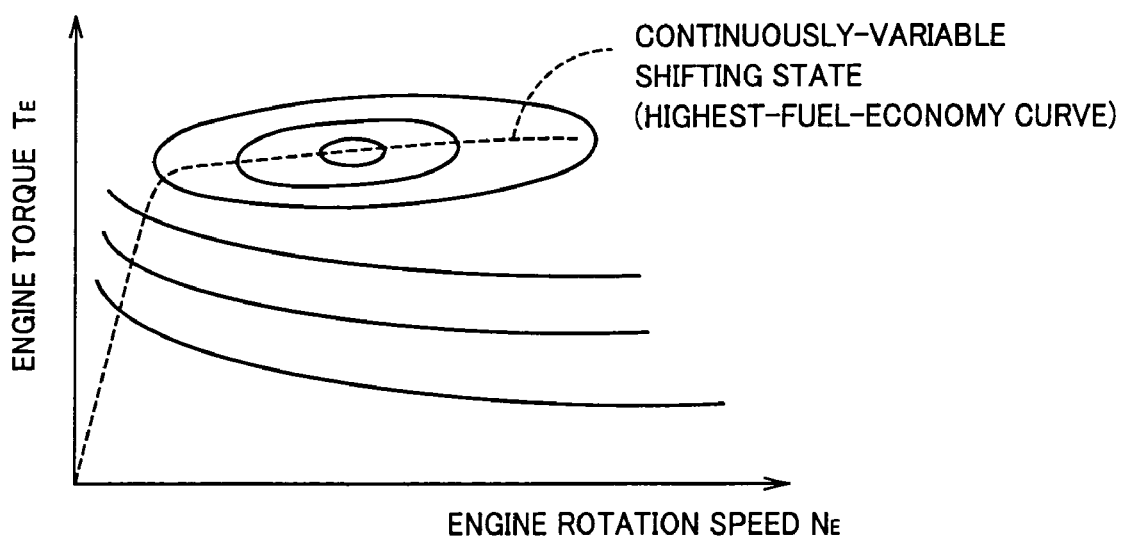
FIG. 9 is a view illustrating one example of a fuel consumption map with a broken line representing an optimal fuel consumption curve of an engine.

That is, the hybrid control means 84 determines a target value of the total speed ratio γT of the transmission mechanism 10 so as to cause the engine 8 to operate on an optimal fuel efficiency curve (a fuel efficiency map and the relationships) of the engine 8, as indicated by a dotted line in FIG. 9. The optimal fuel efficiency curve is preliminarily obtained on experiments and prestored to provide a compromise between driveability and fuel consumption during the running of the vehicle under a continuously variable shifting mode on a two-dimensional coordinate established with the engine rotation speed $N_E$ and output torque (engine torque) $T_E$ of the engine 8.

For instance, the target value of the total speed ratio γT of the transmission mechanism 10 is determined so as to obtain engine torque $T_E$ and engine rotation speed $N_E$ at respective values for generating the engine output needed for the target outputs (a total target output and demanded drive force) to be satisfied. To obtain such target values, the speed ratio γ0 of the differential portion 11 is controlled in consideration of the gear position in the automatic transmission portion 20, thereby controlling the total speed ratio γT within a shiftable varying range.

When this takes place, the hybrid control means 84 allows electric energy, generated by the first electric motor M1, to be supplied through an inverter 54 to a battery 56 and the second electric motor M2. Thus, a major part of the drive force of the engine 8 is mechanically transferred to the power transmitting member 18. However, a remaining part of the drive force of the engine 8 is consumed with the first electric motor M1 to generate electric power for conversion into electric energy. Resulting electric energy is supplied through the inverter 54 into the second electric motor M2, which is consequently driven to generate a drive force that is transmitted to the power transmitting member 18. Thus, an electric path is established by equipment, involved in operations including the step of generating electric power to the step of causing the second electric motor M2 to consume resultant electric energy, in which the part of the drive force of the engine 8 is converted into electric energy which in turn is converted into mechanical energy.

The hybrid control means 84 allows the differential portion 11 to perform an electrically controlled CVT function to control, for instance, the first-motor rotation speed $N_{M1}$. This causes the engine rotation speed $N_E$ to be maintained at a nearly fixed level or to be controlled at an arbitrary rotation speed regardless of the vehicle remaining under a halted condition or a running condition. In other words, the hybrid control means 84 maintains the engine rotation speed $N_E$ at the nearly fixed level or controls the same at the arbitrary rotation speed while rotatably controlling the first-motor rotation speed $N_{M1}$ at an arbitrary rotation speed.

When raising, for instance, the engine rotation speed $N_E$ during the running of the vehicle, the hybrid control means 84 raises the first-motor rotation speed $N_{M1}$ while maintaining a second-motor rotation speed $N_{M2}$ at a nearly fixed level that is bound with the vehicle speed V (represented by wheel velocities of the drive wheels 34) as will be apparent from the collinear chart shown in FIG. 3. Further, in order for the engine rotation speed $N_E$ to be maintained at a nearly fixed level during the shifting of the automatic transmission portion 20, the hybrid control means 84 varies the first-motor rotation speed $N_{M1}$ in a direction opposite to that in which the second-motor rotation speed $N_{M2}$ varies with the shifting of the automatic transmission portion 20 while maintaining the engine rotation speed $N_E$ at the nearly fixed level.

The hybrid control means 84 functionally includes engine output control means for executing the output control of the engine 8 so as to cause the same to generate a demanded engine output. In particular, the hybrid control means 84 causes the throttle actuator 64 to controllably open or close the electronic throttle valve 62 for performing a throttle control. In addition, the hybrid control means 84 outputs commands singly or in combination to an engine output control device 58. This causes a fuel injection device 66 to control a fuel injection quantity and a fuel injection timing for a fuel injection control while permitting an ignition device 68 such as an igniter or the like to control an ignition timing for an ignition timing control.

The hybrid control means 84 is enabled to execute a motor drive (EV drive) mode under which with the engine 8 halted in operation, the second electric motor M2 is driven with electric power, delivered from the battery 56, and serves as a drive-power source comprised of only the second electric motor M2.

For instance, the hybrid control means 84 includes demanded drive-force relevant value calculation means 86 for calculating demanded output torque $T_{OUTt}$ based on an actual accelerator opening Acc by referring to a given property, used to determine demanded output torque $T_{OUTt}$ of the transmission mechanism 10 depending on the accelerator opening Acc. As used herein, the term "given property" refers to the relationship (demanded output torque map) between the accelerator opening Acc, preliminarily obtained on experiments and prestored, and demanded output torque $T_{OUTt}$ as shown, for instance, in FIG. 10. When demanded output torque $T_{OUTt}$, calculated by the demanded drive-force relevant value calculation means 86, is less than a given value $T_{OUTt}$, the EV running mode is executed. In contrast, if demanded output torque $T_{OUTt}$ exceeds the given value $T_{OUT}1$ during the EV running mode, the EV running mode is switched to an engine running mode. In this case, the vehicle is caused to run with a drive-power source mainly comprised of the engine 8. As used herein, the term "given value $T_{OUT}1$" refers to an EV drive permit value that is preliminarily determined on experiments for determining whether to execute the switching from the motor running mode to the engine running mode in consideration of, for instance, output torque of the second electric motor M2.

Figure 10:
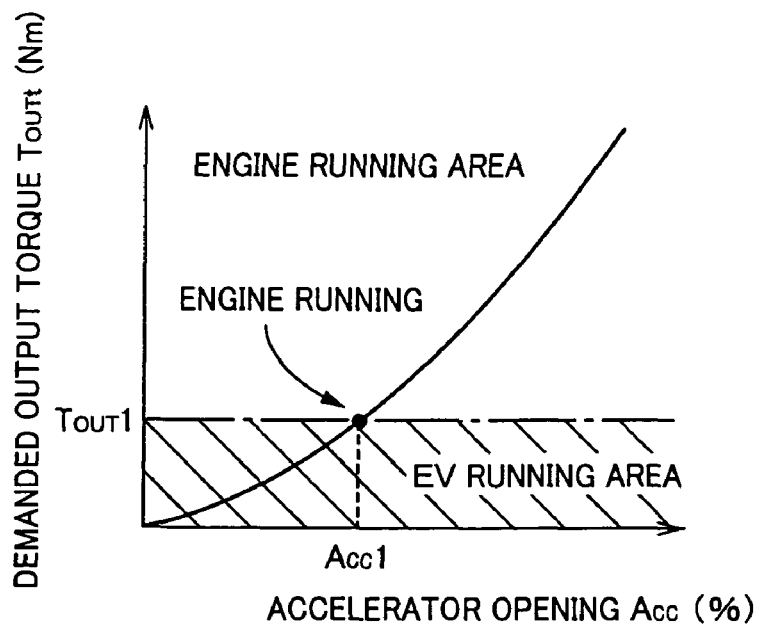
FIG. 10 is a view showing a demanded output torque map, preliminarily obtained on experiments for storage, which represents one example of a given property for use in determining demanded output torque of a transmission mechanism based on an accelerator opening.

In FIG. 10, a hatched area represents an EV running region for the EV running mode to be executed with demanded output torque $T_{OUTt}$ remained less than the given value $T_{OUT}1$. A blank area above the hatched area represents an engine running region for the engine 8 to start up to initiate the engine running mode with demanded output torque $T_{OUTt}$ exceeding the given value $T_{OUT}1$. Thus, the hybrid control means 84 executes the EV running mode at relatively low output torque $T_{OUT}$, i.e., low engine torque $T_E$ at which the engine 8 is regarded to have a lower engine efficiency than that of the engine 8 operating in a high torque range. From another point of view, the hybrid control means 84 executes the EV running mode within a range for the second electric motor M2 to be available to be driven.

The hybrid control means 84 places, for instance, the first electric motor M1 in an unloaded condition for idling while causing the differential portion 11 to initiate the electrically controlled CVT function (differential action) depending on needs such that the engine rotation speed $N_E$ is zeroed or nearly zeroed. This is because such a control minimizes a drag of the engine 8 remaining under a halted condition, thereby improving fuel consumption during the EV running mode.

To perform the switching between the engine running mode and motor running mode, the hybrid control means 84 functionally includes engine-startup stop control means that switches an operating state of the engine 8 between an operative state and a halted state, i.e., starts up or halts the engine 8.

Now, description is made of a situation under which an accelerator pedal is deeply depressed beyond a given accelerator opening Acc1 (see FIG. 10) and demanded output torque $T_{OUT}$ exceeds the given value $T_{OUT}1$. Under such a situation, a vehicle condition is caused to vary from the EV running region to the engine running region. In this case, the engine-startup stop control means determines that the vehicle condition is switched from the EV running region to the engine running region. This corresponds to a situation where engine start (startup) is determined.

In such a case, the hybrid control means 84 turns on the first electric motor M1 to raise the first-motor rotation speed $N_{M1}$, rendering the first electric motor M1 operative as a starter. This increases the engine rotation speed $N_E$ to a value beyond a given rotation speed $N_E'$ enabling complete combustion. At the same time, the fuel injection device 66 supplies (injects) fuel into a combustion chamber at the engine rotation speed $N_E$ beyond the given rotation speed $N_E'$, i.e., for instance, at an autonomously rotatable engine rotation speed $N_E$ beyond an idling rotation speed. Thereafter, the ignition device 68 ignites an air-fuel mixture in the combustion chamber, causing the engine 8 to start up. Thus, the vehicle condition is shifted from the EV running mode to the engine running mode.

Meanwhile, if the accelerator pedal is released to a level less than the given accelerator opening Acc1 (FIG. 10) and demanded output torque $T_{OUT}$ becomes less than the given value $T_{OUT}1$, the hybrid control means 84 operates in a manner described below. Under such a situation, the vehicle condition is caused to vary from the EV running region to the engine running region, and the hybrid control means 84 determines that the vehicle condition is switched from the EV running mode to the engine running mode. This corresponds to a case in which the engine halt is determined. In such a case, the hybrid control means 84 allows the fuel injection device 66 to stop the supply of fuel, i.e., to cut off the supply of fuel.

This results in a halt of the engine 8, thereby switching the vehicle condition from the engine running mode to the EV running mode.

During the engine running mode, the hybrid control means 84 establishes the electric path under which the second electric motor M2 is supplied with electric energy delivered from the first electric motor M1 and/or electric energy delivered from the battery 56. This causes the second electric-motor M2 to be driven, thereby providing torque to the drive wheels 34. This makes it possible to effectuate a so-called torque assist for assisting drive power of the engine 8. Therefore, in the illustrated embodiment, the engine running mode involves a phase covering both the engine running mode and EV running mode.

The hybrid control means 84 renders the first electric motor M1 inoperative under the unloaded condition, thereby permitting free rotation, i.e., idling operation. This causes the differential portion 11 to have the same state as that in which torque transfer is disenabled, i.e., a state in which the power transmitting path of the automatic transmission portion 20 is interrupted with no output being delivered from the differential portion 11. That is, upon rendering the first electric motor M1 inoperative under the unloaded condition, the hybrid control means 84 makes it possible to place the differential portion 11 in a neutral state (neutral condition) with the power transmitting path being electrically interrupted.

Under a circumstance where the vehicle runs in a residential area or the like with a worrisome engine sound in concern, it is conceived that a strong requirement occurs for the EV running mode to be continued as far as possible. However, during the EV running mode, if the accelerator pedal is depressed even for a temporary time period with a resultant increase of demanded output torque $T_{OUT}$ beyond the given value $T_{OUT}$, it is likely that the engine 8 starts up regardless of the strong requirement for the EV running mode to be continued. As used herein, the expression "circumstance with strong requirement occurs for the EV running mode to be continued" is supposed to involve a situation under which, for instance, the driver turns on an EV running mode switch 72 (see FIG. 4) to set the EV running mode requiring the EV running mode to be initiated.

To this end, the control device of the present embodiment includes property alter means 88, operative depending on whether or not the EV running mode is set, which alters a given property used in determining demanded output torque $T_{OUTt}$ of the transmission mechanism 10 based on the accelerator opening Acc.

More particularly, EV running mode determination means 90 operates based on whether or not, for instance, the EV running mode switch 72 is turned on, thereby determining whether or not the EV running mode is set.

In the illustrated embodiment, it is supposed that an EV running mode turn-on state corresponds to a phase in which the EV running mode determination means 90 determines that the EV running mode is set. Likewise, an EV running mode turn-off state is supposed to correspond to a phase in which the EV running mode determination means 90 determines that no EV running mode is set.

The property alter means 88 alters the given property such that for the EV running mode turn-on state, demanded output torque $T_{OUTt}$ determined based on the accelerator opening Acc, has a lower value than that set for the EV running mode turn-off state. For instance, even at the same accelerator opening Acc, the demanded output torque map for the EV running mode turn-on state is altered, as shown in FIG. 10, such that demanded output torque $T_{OUTt}$ decreases to a level lower than that for the EV running mode turn-off state. Therefore, even if the accelerator peal is depressed in the same way both for the EV running mode turn-on state and EV running mode turn-off state, demanded output torque $T_{OUTt}$, determined based on the accelerator opening Acc, for the EV running mode turn-on state has a lower sensitivity than that of demanded output torque $T_{OUTt}$ for the EV running mode turn-off state. This results in the suppression of the occurrence of engine startup.

Further, the property alter means 88 may alter the given property for the EV running mode turn-on state based on the vehicle speed V. For instance, the property alter means 88 alters the given property so as to decrease demanded output torque $T_{OUTt}$, determined based on the accelerator opening Acc, as the vehicle speed V decreases. For instance, even at the same accelerator opening Acc, the property alter means 88 alters the demanded output torque map for the EV running mode turn-on state such that with decrease of the vehicle speed V, demanded output torque $T_{OUTt}$ decreases as shown in FIG. 10.

Thus, even if the accelerator pedal is depressed for the EV running mode turn-on state in the same way during the EV running mode, demanded output torque $T_{OUTt}$, determined based on the accelerator opening Acc, can have a sensitivity decreasing with decrease of the vehicle speed under a situation where a stronger requirement occurs for the EV running mode to be initiated in an area with a further worrisome engine sound in concern. This results in the suppression of the occurrence of engine startup.

It is conceived that in an area wherein the vehicle runs at a middle and high speed, a relatively less concern is present for the engine sound and instead stronger concern is present for power performance. With this in mind, the given property may be altered such that demanded output torque $T_{OUTt}$, determined based on the accelerator opening Acc, has the same sensitivity as that of demanded output torque $T_{OUTt}$ for the EV running mode turn-off state. That is, the property alter means 88 alters the given property such that with increase of the vehicle speed V, demanded output torque $T_{OUTt}$, determined based on the accelerator opening Acc approximates demanded output torque $T_{OUTt}$ for the EV running mode turn-off state.

For instance, the demanded output torque map shown in FIG. 10 is altered such that for the EV running mode turn-on state, demanded output torque $T_{OUTt}$ at the same accelerator opening Acc approaches demanded output torque $T_{OUTt}$ for the EV running mode turn-off state as the vehicle speed V increases. With such alteration, even if the EV running mode turn-on state is present, the EV running mode can be continuously executed in a low vehicle speed range as required by the driver without sacrificing power performance in the middle and high vehicle speed range.

Figure 11:
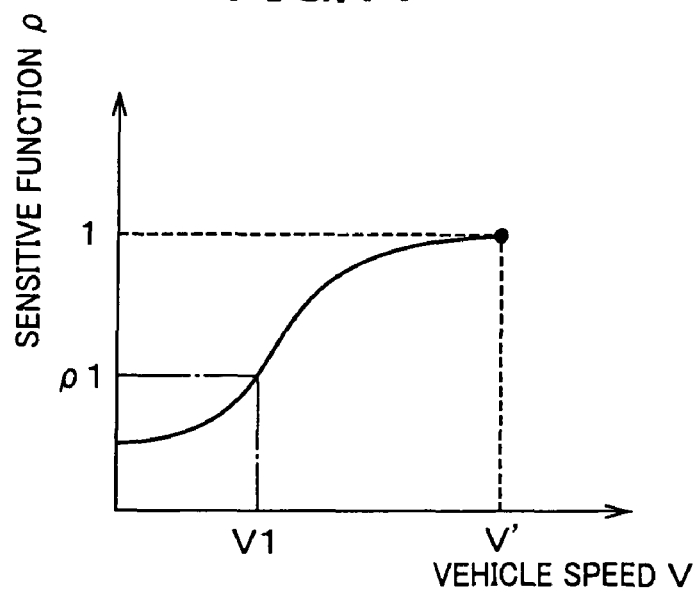
FIG. 11 is a view showing one example of a sensitivity function map between a sensitivity function and a vehicle speed that is preliminarily obtained on experiments for storage.

FIG. 11 is a view showing one example of the relationship (sensitivity function map) between a sensitivity function ρ and a vehicle speed V that is preliminarily obtained on experiments for storage. The sensitivity function is used for obtaining demanded output torque $T_{OUTt}$ for the EV running mode turn-on state upon multiplying demanded output torque $T_{OUTt}$ for the EV running mode turn-off state by the sensitivity function. This is because demanded output torque $T_{OUTt}$, determined based on the accelerator opening Acc, for the EV running mode turn-on state is required to have a lower sensitivity than that of demanded output torque $T_{OUTt}$ for the EV running mode turn-off state.

In FIG. 11, the sensitivity map is set so as to decrease the sensitivity function ρ as the vehicle speed decreases such that demanded output torque $T_{OUTt}$, determined based on the accelerator opening Acc has the sensitivity decreasing as the vehicle speed decreases. With the vehicle speed V beyond a given vehicle speed V', the sensitivity function ρ is set to a value of "1". This is because demanded output torques $T_{OUTt}$, determined based on the accelerator opening Acc lay at the same value both for the EV running mode turn-on state and EV running mode turn-off state. As used herein, the term "given vehicle speed V'" refers to a determination vehicle speed, preliminarily obtained on experiments, which represents a vehicle speed at which demanded output torque $T_{OUTt}$ determined based on the accelerator opening Acc for the EV running mode turn-on state, is made equal to demanded output torque $T_{OUTt}$ for the EV running mode turn-off state. This is because for the EV running mode turn-on state, a relatively less concern is present for the engine sound and instead stronger concern is present for power performance.

Figure 12A:
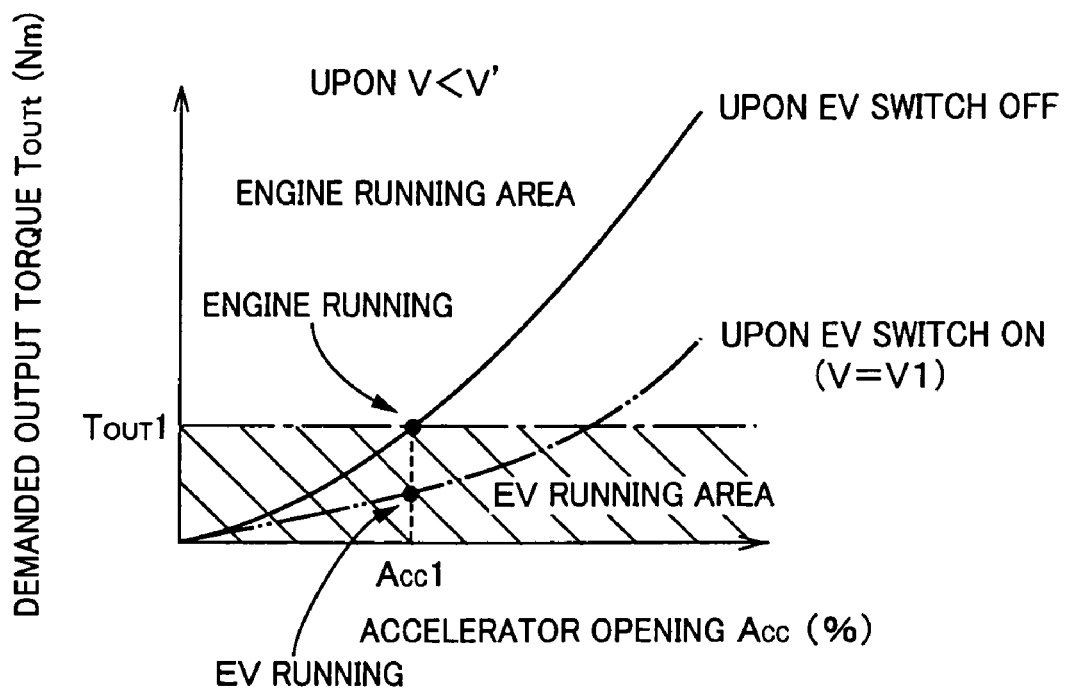
FIG. 12A is a view showing one example of a demanded output torque map with a vehicle speed remaining at a low vehicle speed range less than a given vehicle speed.
Figure 12B:
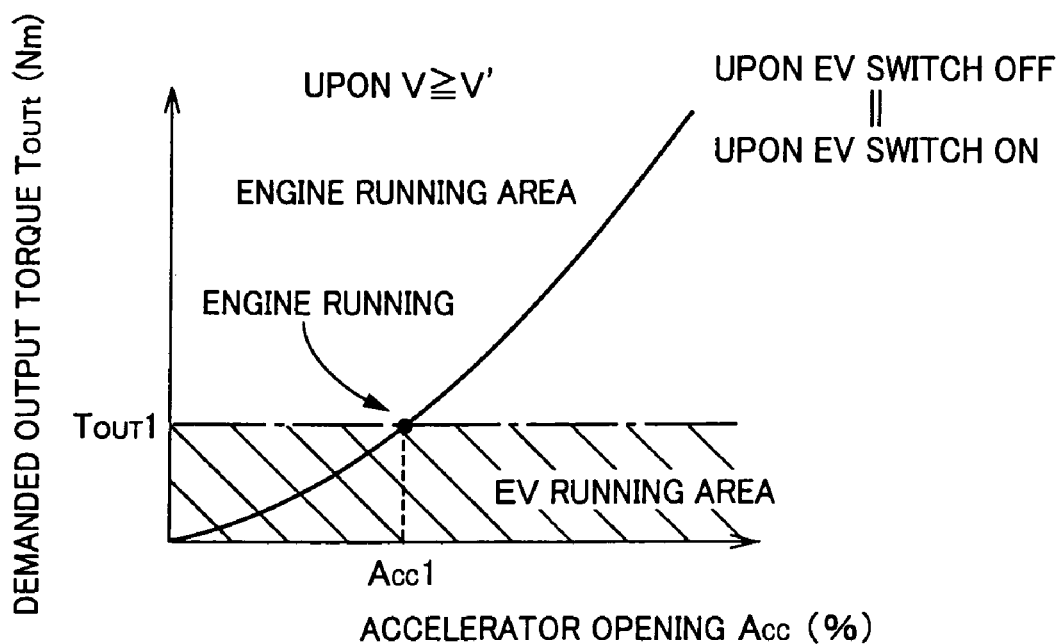
FIG. 12B is a view showing one example of another demanded output torque map with the vehicle speed remaining at a middle and high vehicle speed range greater than the given vehicle speed.

FIGS. 12A and 12B are views showing demanded output torque maps similar to that shown in FIG. 10. FIG. 12A represents one example of the demanded output torque map for a case in which the vehicle speed V belongs to a low vehicle speed region to be less than the given vehicle speed V'. FIG. 12B represents another example of the demanded output torque map for a case in which the vehicle speed V belongs to a middle and high vehicle speed region to be higher than the given vehicle speed V'.

In FIG. 12A, a solid line represents the demanded output torque map for the EV running mode turn-off state which has a property equivalent to, for instance, the demanded output torque map shown in FIG. 10. In addition, a double-dot line represents the demanded output torque map for the EV running mode turn-on state which has a property obtained by multiplying the demanded output torque map for the EV running mode turn-off state by the sensitivity function ρ, shown in FIG. 11, i.e., for instance, a sensitivity function ρ1 for a vehicle speed V1.

As will be apparent from FIG. 12A, if, for instance, the accelerator pedal is depressed during the EV running mode and the accelerator opening Acc lies at a given accelerator opening Acc1, demanded output torque $T_{OUT}$ lies at a given value $T_{OUT}1$ for the EV running mode turn-off state. In this moment, the vehicle condition is caused to vary from the EV running region to the engine running region to start up the engine 8. In contrast, during the EV running mode turn-on state, demanded output torque $T_{OUT}$ becomes less than the given value $T_{OUT}1$ with the vehicle condition remained unchanged in the EV running region. Therefore, no startup of the engine 8 occurs and the EV running mode is sustained.

In FIG. 12B, a solid line represents the demanded output torque map for the EV running mode turn-off state similar to the demanded output torque map shown in FIG. 12A. However, under a situation where the vehicle speed V increases beyond the given vehicle speed V', the property alter means 88 uses the same demanded output torque map as that for the EV running mode turn-off state even in the EV running mode turn-on state. Therefore, in the middle and high vehicle speed region where the vehicle speed V exceeds the given vehicle speed V', the drive system ensures power performance equivalent to that for the EV running mode turn-off state.

During the EV running mode turn-on state, for instance, if vehicle speed determination means 92 determines that the vehicle speed V is less than the given vehicle speed V', the proper alter means 88 calculates the sensitivity function ρ based on an actual vehicle speed V by referring to the sensitivity function map shown in FIG. 11. Multiplying the demanded output torque map for the EV running mode turn-off state by the sensitivity function ρ allows the demanded output torque map to be set for the EV running mode turn-on state.

The demanded drive-force relevant value calculation means 86 calculates the demanded output torque $T_{OUT}$ based on an actual accelerator opening Acc by referring to the demanded output torque map for the EV running mode turn-on state.

In contrast, during the EV running mode turn-off state or the EV running mode turn-on state, if the vehicle speed determination means 92 determines that the vehicle speed V is higher than the given vehicle speed V', the demanded drive-force relevant value calculation means 86 calculates demanded output torque $T_{OUT}$ based on the actual accelerator opening Acc by referring to the demanded output torque map for the EV running mode turn-off state.

If demanded output torque $T_{OUT}$, calculated by the demanded drive-force relevant value calculation means 86, is less than the given value $T_{OUT}1$ with the vehicle condition remained under the EV running region, then the hybrid control means 84 drives only the second electric motor M2 so as to obtain relevant demanded output torque $T_{OUT}$ thereby executing the EV running mode. On the contrary, if demanded output torque $T_{OUT}$ calculated by the demanded drive-force relevant value calculation means 86, exceeds the given value $T_{OUT}1$ with the vehicle condition remained under the engine running region, then the hybrid control means 84 allows the engine 8 to start up so as to obtain relevant demanded output torque $T_{OUT}$ thereby executing the engine running mode.

Figure 13:
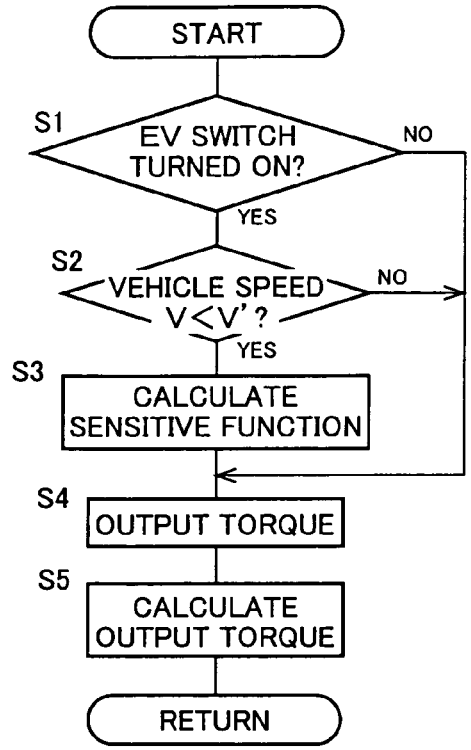
FIG. 13 is a flowchart illustrating a basic sequence of control operations to be executed by the electronic control unit shown in FIG. 4, i.e., a basic sequence of control operations to be executed for suppressing the occurrence of engine startup initiated in response to a request on an EV running.

FIG. 13 is a flowchart illustrating a basic sequence of major control operations to be executed by the electronic control unit 80, i.e., a basic sequence of control operations to be executed for suppressing the occurrence of engine startup to comply with the request on the EV running mode. This sequence is repeatedly executed for extremely short cycles each of the order of approximately, for instance, several milliseconds to several tens milliseconds.

First, in step (hereinafter the term "step" will be omitted) S1 corresponding to the EV running mode determination means 90, the operation is executed to determine whether or not the EV running mode is set, i.e., for instance, based on whether or not the EV running mode switch 72 remains in a turn-on state.

If the determination in S1 is made positive, then in S2 corresponding to the vehicle speed determination means 92, the determination is made whether or not the vehicle speed V is less than the given vehicle speed V'.

If the determination in S2 is made positive, then in S3 corresponding to the property alter means 88, the sensitivity function ρ is calculated based on the actual vehicle speed V by referring to the sensitivity function map for instance as shown in FIG. 11. Multiplying the demanded output torque map for the EV running mode turn-off state, for instance, as shown in FIG. 12, by the sensitivity function ρ allows the demanded output torque map to be set for the EV running mode turn-on state.

In S4 corresponding to the demanded drive-force relevant value, calculation means 86 in sequence subsequent to S3, demanded output torque $T_{OUT}$ is calculated. This similarly applies to a case wherein the determination in S1 is made negative or the determination in S2 is made negative. For instance, if both the determinations in S1 and S2 are made positive, demanded output torque $T_{OUT}$ is calculated based on the actual accelerator opening Acc by referring to the demanded output torque map for the EV running mode turn-on state set in S3.

On the contrary, if both the determinations in S1 and S2 are made negative, demanded output torque $T_{OUT}$ is calculated based on the actual accelerator opening Acc by referring to the demanded output torque map for the EV running mode turn-off state as shown in FIGS. 12A and 12B.

If demanded output torque $T_{OUT}$ calculated in S4 is less than the given value $T_{OUT}1$ with the vehicle condition remains under the EV running region, in succeeding S5 corresponding to the hybrid control means 84, only the second electric motor M2 is driven to execute the EV running mode. This allows relevant demanded output torque $T_{OUT}$ to be obtained. In contrast, if demanded output torque $T_{OUT}$ calculated in S4 exceeds the given value $T_{OUT}1$ and the vehicle condition crosses the EV running region to the engine running region, then, the engine 8 is caused to start up to execute the engine running mode. Thus, relevant demanded output torque $T_{OUT}$ is obtained.

In the illustrated embodiment, as set forth above, the property alter means 88 alters the given property used for determining demanded output torque $T_{OUTt}$ of the transmission mechanism 10 based on the accelerator opening Acc depending on whether or not the EV running mode is set. This enables the suppression of the occurrence of engine startup to comply with the request on the EV running mode. For instance, during the EV running mode turn-on state, the property alter means 88 alters the given property such that demanded output torque $T_{OUT}$, determined based on the accelerator opening Acc, for the EV running mode turn-on state lies at a lower level than that for the EV running mode turn-off state. That is, this causes a drop in sensitivity of demanded output torque $T_{OUT}$ determined based on the accelerator opening Acc. This results in a consequence of suppressing the occurrence of engine startup that would be induced upon the depressing operation of the accelerator pedal during the EV running mode.

In the illustrated embodiment, the property alter means 88 can alter the given property based on the vehicle speed V during the EV running mode turn-on state. This enables the suppression of the occurrence of engine startup depending on the vehicle speed V. For instance, the property alter means 88 alters the given property such that as the vehicle speed V decreases, demanded output torque $T_{OUTt}$ determined based on the accelerator opening Acc, decreases. This suppresses the occurrence of engine startup during the EV running mode under a circumstance where the vehicle runs at a low speed in a residential area or the like with a worrisome engine sound in concern in the presence of a stronger demand for the EV running mode.

In the illustrated embodiment, the property alter means 88 can alter the given property such that as the vehicle speed V increases, demanded output torque $T_{OUTt}$ determined based on the same accelerator opening Acc, approximates demanded output torque $T_{OUT}$ for the EV running mode turn-off state. Therefore, even during the EV running mode turn-on state, under a circumstance where the vehicle runs at the middle and high vehicle speed with a stronger demand present for power performance, relevant power performance can be caused to approach excellent power performance attained with the EV running mode turn-off state. That is, the EV running mode can be continued in the low vehicle speed region as required by the driver without sacrificing power performance in the middle and high vehicle speed region.

Next, another embodiment according to the present invention will be described below. Also, in the following description, the same component parts common to those used in various embodiments bear like reference numerals to omit descriptions of the same

Embodiment 2

Figure 14:
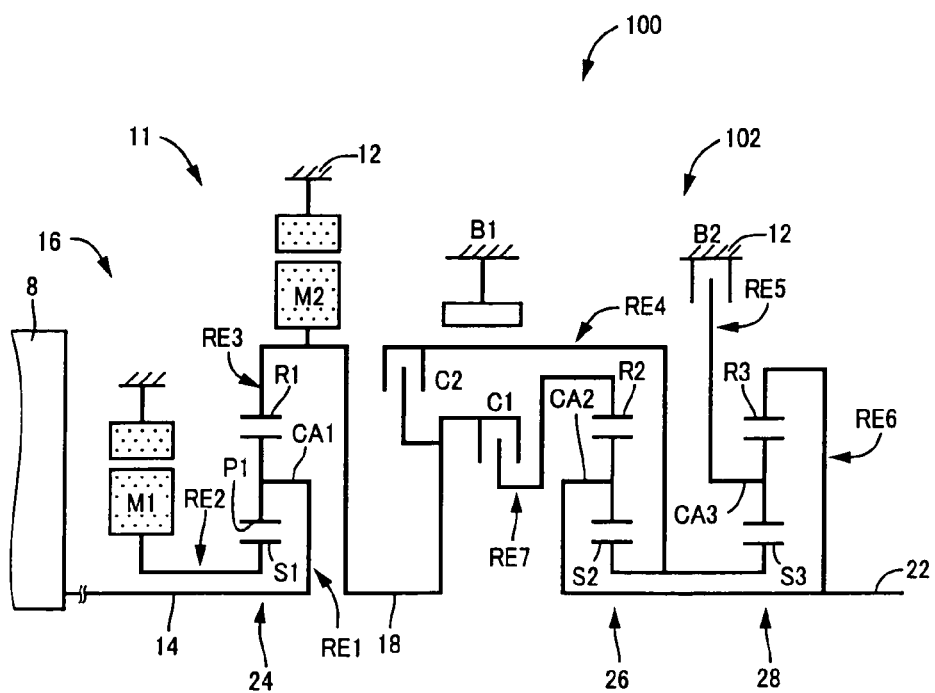
FIG. 14 is a skeleton view illustrating a structure of a drive system of another embodiment according to the present invention for use in a hybrid vehicle.
Figures 15, 16:
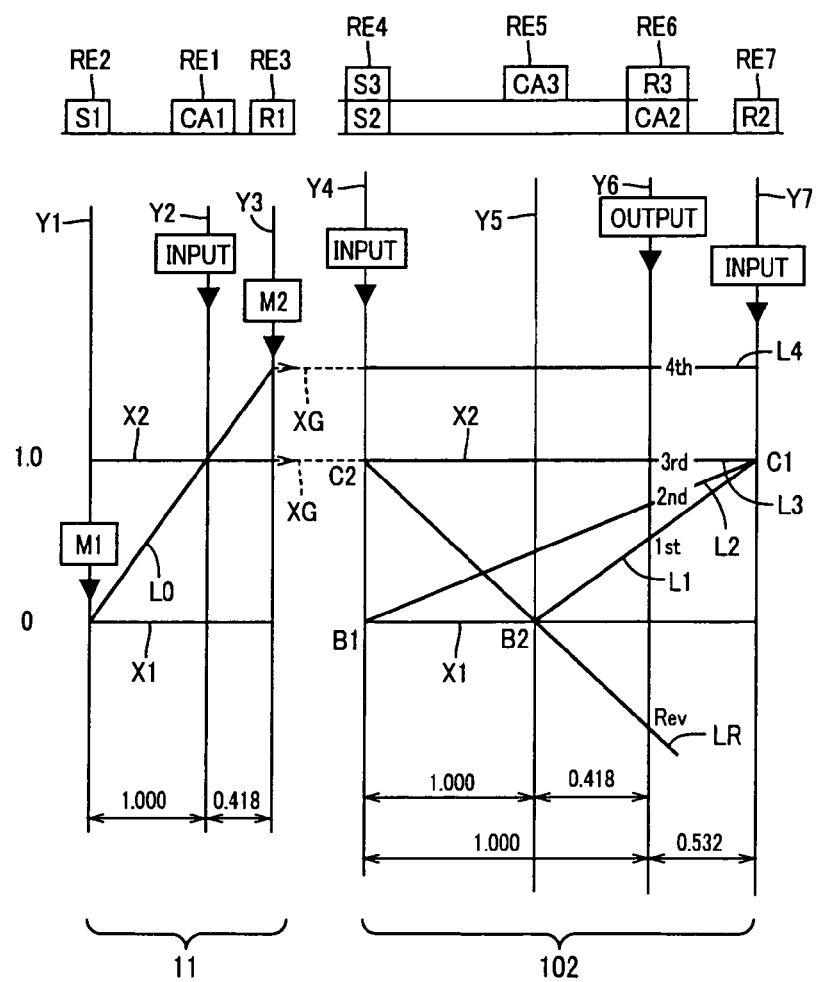
FIG. 15 is an operation diagram table, illustrating combined operations of hydraulically operated frictional coupling devices for use in performing shifting operations in the vehicular drive system shown in FIG. 14, which corresponds to the view of FIG. 2.
FIG. 16 is a collinear chart, indicating mutually relative rotating speeds for various gear positions in the vehicular drive system shown in FIG. 14, which corresponds to the view of FIG. 3.

Second embodiment will be explained with reference to FIGS. 14 to 16. FIG. 14 is a skeleton view illustrating a structure of a transmission mechanism 100 of another embodiment according to the present invention. FIG. 15 is an engagement operation diagram representing combined operations of hydraulically operated frictional engaging devices for use in shifting operations of the transmission mechanism 100. FIG. 16 is a collinear chart illustrating the shifting operations of the transmission mechanism 100.

Like the first embodiment, the transmission mechanism 100 includes the differential portion 11 comprised of the first electric motor M1, the power transmitting mechanism 16 and the second electric motor M2, and a forward-drive three-stage automatic transmission portion 102 connected between the differential portion 11 and the output shaft 22 in series via the power transmitting member 18. The power transmitting mechanism 16 includes the single-pinion type first planetary gear set 24 having the given gear ratio ρ1 of approximately, for instance, "0.418". The automatic transmission portion 102 includes the single-pinion type second planetary gear set 26 having the given gear ratio ρ2 of approximately, for instance, "0.532" and single-pinion type third planetary gear set 28 having the given gear ratio ρ3 of approximately, for instance, "0.418".

The second and third planetary gear sets 26 and 28 have the second and third sun gears S2 and S3, respectively, which are unitarily connected to each other and selectively connected to the power transmitting member 18 and the casing 12 via the second clutch C2 and first brake B1, respectively. The second and third planetary gear sets 26 and 28 have the second carrier CA2 and third ring gear R3, respectively, which are unitarily connected to each other and connected to the output shaft 22. The second ring gear R2 is connected to the power transmitting member 18 via the first clutch C1 and the third carrier CA3 is selectively connected to the casing 12 via the second brake B2.

Thus, the internal component parts of the automatic transmission portion 102 and the differential portion 11 (power transmitting member 18) are selectively connected to each other via the first and second clutches C1 and C2 for causing the automatic transmission portion 102 to establish the gear position. In other words, the first and second clutches C1 and C2 function as coupling devices for selectively switching the power transmitting path between the power transmitting member 18 and automatic transmission portion 102, i.e., the power transmitting path between the differential portion 11 (power transmitting member 18) and drive wheels 18 in one of a power transmitting state and power cut-off i.e., interrupted state. That is, upon coupling at least one of the first and second clutches C1 and C2, the power transmitting path is placed in the power transmitting state. In contrast, upon uncoupling the first and second clutches C1 and C2, the power transmitting path is placed in the power cut-off state.

With the automatic transmission portion 102, uncoupling the on-uncoupling side coupling device and coupling the on-coupling side coupling device allows the clutch-to-clutch shift to be executed for selectively establishing the various gear positions (gear shift positions). This enables each gear position to be obtained with the gear ratio γ (=transmitting-member rotation speed $N_{18}$/output-shaft rotation speed $N_{OUT}$) in nearly equal ratio. As represented by the engagement operation table shown in FIG. 15, for instance, coupling the first clutch C1 and second brake B2 allows the 1st-speed gear position to be established with a gear ratio γ1 in a maximal value of approximately, for instance, "2.804". Coupling the first clutch C1 and first brake B1 allows a 2nd-speed gear position to be established with a gear ratio γ2 of approximately, for instance, "1.531" less than that of the 2nd-speed gear position. Coupling the first and second clutches C1 and C2 allows a 3rd-speed gear position to be established with a gear ratio γ3 of approximately, for instance, "1.000" less than that of the 2nd-speed gear position.

Coupling the second clutch C2 and second brake B2 allows a reverse-drive gear position (reverse-drive gear shift position) to be established with a gear ratio γR of approximately, for instance, "2.393" intermediate in value between the 1st- and 2nd-speed gear positions. In addition, uncoupling the first and second clutches C1 and C2 and first and second brakes B1 and B2 allows a neutral position "N" to be established. Moreover, as indicated by the engagement operation table shown in FIG. 15, the coupling devices of the automatic transmission portion 20 are operated for a 4th-speed gear position under the same engagement operations as those of the coupling devices operated for a 3rd-speed position.

With the transmission mechanism 100 of such a structure mentioned above, the differential portion 11 functioning as the continuously variable transmission, and the automatic transmission portion 102 constitute the continuously variable transmission. In addition, controlling the differential portion 11 to maintain the speed ratio at a fixed level enables the differential portion 11 and automatic transmission portion 102 to form a state equivalent to a step-variable transmission.

More particularly, the differential portion 11 functions as the continuously variable transmission, and the automatic transmission portion 102 connected to the differential portion 11 in series functions as the step-variable transmission. This allows a rotation speed (hereinafter referred to as an input rotation speed of the automatic transmission portion 102), i.e., a rotation speed of the power transmitting member 18, to be input to the automatic transmission portion 102 at a steplessly i.e., continuously varying rate for at least one shift position M of the automatic transmission portion 102. This causes the shift position M to have a continuously variable speed ratio in shifting. Accordingly, the transmission mechanism 100 has an overall speed ratio γT in an infinitely variable range, causing the transmission mechanism 100 to form a continuously variable transmission.

Thus, the transmitting-member rotation speed $N_{18}$ is caused to continuously vary for each of the various gear positions of the 1st- to 3rd-speed gear positions and reverse-drive gear position of the automatic transmission portion 102. This causes each gear position to continuously vary in speed ratio as indicated, for instance, by the engagement operation table shown in FIG. 5. Consequently, an intermediate position between the adjacent gear positions is steplessly or continuously variable in speed ratio, causing the transmission mechanism 100 as a whole to have a total speed ratio γT in an infinitely variable rate.

Upon operation of the differential portion 11 controlled at a fixed speed ratio with the clutch C and brake B selectively coupled, either one of the 1st- to 3rd-speed gear positions or the reverse-drive gear position (reverse-drive gear shift position) is selectively established. When this takes place, the total speed ratio γT of the transmission mechanism 100 is variable in a nearly equal ratio i.e., geometrically for each gear position. Accordingly, the transmission mechanism 100 can establish a state equivalent to the step-variable transmission.

With the differential portion 11 controlled to have a gear ratio γ0 fixed at a value of "1", for instance, the transmission mechanism 100 has a total speed ratio γT for each of the gear positions corresponding to the 1st- to 3rd-speed gear positions and reverse-drive gar position of the automatic transmission portion 102, as indicated by the engagement operation table shown in FIG. 15. In addition, with the automatic transmission portion 102 placed in the 3rd-speed gear position, if the differential portion 11 is controlled to have a gear ratio γ0 fixed at a value of approximately, for instance, "0.7" less than a value of "1", the transmission mechanism 100 has a total speed ratio γT in a value of approximately, for instance, "0.705" that is less than a value of the 3rd-speed gear position as indicated by the 4th-speed gear position in the engagement operation table shown in FIG. 15.

FIG. 16 shows a collinear chart for the transmission mechanism 100, comprised of the differential portion 11 and automatic transmission portion 102, which has straight lines plotted for the relative motion relationships among the rotation speeds of the various rotary elements placed in different coupling states for each gear position.

Starting from the left in sequence, four vertical lines Y4 to Y7 represent: rotation speeds of the second and third sun gears S2 and S3 corresponding to the fourth rotary element (fourth element) RE4 and connected to each other; a rotation speed of the third carrier CA3 corresponding to the fifth rotary element (fifth element) RE5; rotation speeds of the second carrier CA2 and third ring gear R3 and S3 corresponding to the sixth rotary element (sixth element) RE4 and connected to each other; and a rotation speed of the second ring gear R2 corresponding to the seventh rotary element (seventh element), respectively.

With the automatic transmission portion 102, the fourth rotary element RE4 is selectively connected to the power transmitting member 18 and casing 12 via the second clutch C2 and first brake B1, respectively. The fifth rotary element RE5 is selectively connected to the casing 12 via the second brake B2. The sixth rotary element RE6 is connected to the output shaft 22 of the automatic transmission portion 102 and the seventh rotary element RE7 is selectively connected to the power transmitting path 18 via the first clutch C1.

In the automatic transmission portion 102, if the straight line L0 is caused to match the horizontal line X2 in the differential portion 11 and the differential portion 11 inputs a rotary motion to the seventh rotary element RE7 at the same rotation speed as the engine rotation speed $N_E$, the first clutch C1 and second brake B2 are coupled as indicated in FIG. 16. In this case, a rotation speed of the output shaft 22 for the 1st-speed gear position is indicated by an intersecting point between an inclined line L1, passing across an intersecting point between the vertical line Y7 representing the rotation speed of the seventh rotary element RE7 (R2), and the horizontal line X2 and an intersecting point between the vertical line Y5 representing the rotation speed of the fifth rotary element RE5 (CA3), and the horizontal line X1, and the vertical line Y6 representing the rotation speed of the sixth rotary element RE6 (CA2 and R3) connected to the output shaft 22.

Likewise, a rotation speed of the output shaft 22 for the 2nd-speed gear position is indicated by an intersecting point between an inclined straight line L2 determined with the first clutch C1 and first brake B1 being coupled, and the vertical line Y6 representing the sixth rotary element RE6 connected to the output shaft 22. A rotation speed of the output shaft 22 for the 3rd-speed gear position is indicated by an intersecting point between a horizontal line L3, determined with the first and second clutches C1 and C2 being coupled, and the vertical line Y6 representing the sixth rotary element RE6 connected to the output shaft 22.

In the differential portion 11, if the straight line L0 is placed in a state shown in FIG. 16 with the differential portion 11 inputting a rotary motion to the seventh rotary element RE7 at a rotation speed higher than the engine rotation speed $N_E$, a rotation speed of the output shaft 22 for the 4th-speed gear position is indicated by an intersecting point between a horizontal line L4 determined with the first and second clutches C1 and C2 being coupled, and the vertical line Y6 representing the rotation speed of the sixth rotary element RE6 connected to the output shaft 22 as shown in FIG. 6.

Even in the second illustrated embodiment, the transmission mechanism 100 is structured of the differential portion 11 and the automatic transmission portion 102 with the same advantageous effect as those of the first embodiment.

In the foregoing, while the present invention has been described with reference to the embodiments shown in the drawings, it is to be appreciated that the present invention may be implemented in combination of the various embodiments and in other modifications.

In the illustrated embodiments, for instance, if the vehicle speed V is less than the given vehicle speed V' during the EV running mode turn-on state, the demanded output torque map for the EV running mode turn-on state is set upon multiplying the demanded output torque map for the EV running mode turn-off state by the sensitivity function ρ that varies depending on the vehicle speed. However, the demanded output torque map for the EV running mode turn-on mode may be preliminarily obtained and stored on experiments in terms of a parameter of the vehicle speed V such that as the vehicle speed decreases, demanded output torque $T_{OUT}$ decreases. In such a case, no need arises for calculating the sensitivity function ρ by referring to the sensitivity function map and no sensitivity function map is required in nature.

In the illustrated embodiment discussed above, the hybrid vehicle to which the present invention is applied has been exemplified as having the transmission mechanism 10. However, the present invention is not limited to such a concept and a power-drive source may be employed for a vehicle to be driven and include an electric motor, operating on electric energy, and an engine operating on fuel combustion. The present invention may have an application to a hybrid vehicle formed in such a structure that is operative based on a vehicle condition, such as demanded output torque or the like, whereby the vehicle condition is switched between an EV running mode depending on a drive-power source composed of only an electric motor, and an engine running mode depending on another drive-power source mainly composed of an engine.

In the illustrated embodiment set forth above, the differential portion 11 (power distributing mechanism 16) is configured to function as the electrically controlled continuously variable transmission in which the speed ratio y0 is continuously varied from the minimal value $γ0_{min}$ to the maximal value $γ0_{max}$. However, the present invention may be applied even to a case wherein the speed ratio γ0 of the differential portion 11 is not continuously varied but pretended to vary step-by-step with the use of a differential action.

In the illustrated embodiment set forth above, the differential portion 11 may be of the type that includes a differential action limiting device incorporated in the power distributing mechanism 16 for limiting a differential action to be operative as at least a forward two-stage step-variable transmission.

With the power distribution mechanisms 16 of the illustrated embodiments, the first carrier CA1 is connected to the engine 8, the first sun gear S1 is connected to the first electric motor M1 and the first ring gear R1 is connected to the power transmitting member 18. However, the present invention is not necessarily limited to such connecting arrangement and the engine 8, first electric motor M1 and power transmitting member 18 have no objection to be connected to either one of the three elements CA1, S1 and R1 of the first planetary gear set 24.

Although the illustrated embodiment has been described with reference to the engine 8 directly connected to the input shaft 14, these component parts may suffice to be operatively connected via, for instance, gears, belts or the like and no need arises for these component parts to be necessarily disposed on a common axis.

In the illustrated embodiment, with the first electric motor M1 and second electric motor M2, the first electric motor M1 coaxially connected to the input shaft 14 is connected to the power transmitting member 18 to which the second electric motor M2 connected to the first sun gear S1, is connected. However, no need arises for these component parts to be necessarily placed in such connecting arrangement. For example, the first electric motor M1 may be connected to the first sun gear S1 through gears, a belt or the like, and the second electric motor M2 may be connected to the power transmitting member 18.

In the illustrated embodiment, the hydraulically operated frictional coupling devices such as the first and second clutches C1 and C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 70 may not include a valve device for switching hydraulic passages and may be replaced with a switching device or electromagnetically operated switching device or the like that are operative to switch electrical command signal circuits for electromagnetic clutches.

In the illustrated embodiment, each of the automatic transmission portions 20 and 102 is disposed in the power transmitting path between the power transmitting member 18 serving as the output member of the differential portion 11, i.e., the power distributing mechanism 16 and the drive wheels 34. However, the power transmitting path may incorporate a power transmission portion (transmission) of other type. For instance, this may include a continuously variable transmission (CVT) acting as an automatic transmission of one kind, and an automatic transmission or the like including a constant-mesh type parallel shaft transmission, well known as a manual shift transmission, and including an automatic transmission composed of select cylinders and shift cylinders to automatically switch gear positions, and a manual transmission or the like of a synchronizing mesh type in which the gear positions are manually shifted.

In the illustrated embodiment, each of the automatic transmission portions 20 and 102 is connected to the differential portion 11 in series via the power transmitting member 18. However, a countershaft may be provided in parallel to the input shaft 14 and each of the automatic transmission portions 20 and 102 may be coaxially disposed on an axis of the countershaft. In this case, the differential portion 11 and each of the automatic transmission portions 20 and 102 may be connected to each other in power transmitting capability via a set of transmitting members structured of, for instance, a counter-gear pair acting as the power transmitting member 18, and a sprocket and chain.

The power distributing mechanism 16 serving as the differential mechanism in the illustrated embodiment, may include for instance a differential gear set in which a pinion rotatably driven with the engine, and a pair of bevel gears held in meshing engagement with the pinion are operatively connected to the first electric motor M1 and the power transmitting member 18 (second electric motor M2).

The power distributing mechanism 16 of the illustrated embodiment has been described above as including one set of planetary gear units. However, the power distributing mechanism 16 may include two or more sets of planetary gear units that are arranged to function as a transmission having three or more speed positions under a non-differential state (fixed shifting state). In addition, the planetary gear unit is not limited to the single-pinion type, but may be of a double-pinion type.

The shift operation device 50 of the illustrated embodiment has been described with reference to the shift lever 52 operative to select a plurality of kinds of shift positions $P_{SH}$. However, the shift lever 52 may be replaced by other type of switch or device. These may include, for instance: a select switch such as a press-button type switch and a slide-type switch or the like available to select one of a plurality of shift positions $P_{SH}$; a device operative to switch a plurality of shift positions $P_{SH}$ in response not to the manipulation initiated by the hand but to a driver's voice; and a device operative to switch a plurality of shift positions $P_{SH}$ in response to the manipulation initiated by the foot.

Like the illustrated embodiment described above, shifting the shift lever 52 to the "M" position allows shift positions to be set, i.e., the highest speed gear position for each shift range to be set in place of setting the shifting range. In this case, each of the automatic transmission portions 20 and 102 allows the shift position to be switched for executing the shifting action. For example, as the shift lever 52 is manually operated to an upshift position "+" or a downshift position "−" in the "M" position, the automatic transmission portion 20 allows any of the 1st-speed gear position to the 4th-speed gear position to be set depending on a manipulated position of the shift lever 52.

The foregoing merely illustrates the embodiments for illustrating the principles of the present invention. It will be appreciated by those skilled in the art that various modifications and alternatives to those details could be developed in the light of the overall teachings of the disclosure.

What is claimed is:

1. A control device for a hybrid vehicle including an engine and an electric motor, establishing a motor running state with only the electric motor serving as a drive-power source, and being switched to an engine running state with the engine enabled to serve as a main drive-power source for running the vehicle, if a demanded drive-force relevant value demanded to the vehicle exceeds a given value during the motor running state, the control device comprising relationship alter means for altering a given relationship used in determining the demanded drive-force relevant value depending on an output demanded operation amount applied by a driver, by referring to whether or not a motor running mode demanded for the motor running state is set.

2. A control device for hybrid vehicle according to claim 1, wherein the relationship alter means is operative to alter the given relationship such that the demanded drive-force relevant value determined based on the output demanded operation amount of the driver is a lower value when the motor running mode is set, than in a value appearing when no motor running mode is set.

3. A control device for hybrid vehicle according to claim 1, wherein the relationship alter means alters the given relationship, when the motor running mode is set, depending on a vehicle speed relevant value.

4. A control device for hybrid vehicle according to claim 3, wherein the relationship alter means alters the given relationship such that the demanded drive-force relevant value determined based on the output demanded operation amount of the driver decreases with a decrease in the vehicle speed relevant value.

5. A control device for hybrid vehicle according to claim 4, wherein the relationship alter means alters the given relationship such that with increase of the vehicle speed relevant value, the demanded drive-force relevant value determined based on the output demanded operation amount approximates a value of the demanded drive-force relevant value when no motor running mode is set.

6. A control device for hybrid vehicle according to claim 3, wherein the vehicle speed relevant value is a relevant value, corresponding to a vehicle speed representing a speed of the vehicle in a one to one relationship.

7. A control device for hybrid vehicle according to claim 1, wherein a drive force relevant value for the demanded drive-force relevant value is a relevant value, corresponding to a vehicle drive force with the drive wheels acting on a ground surface in a one to one relationship.

8. A control device for hybrid vehicle according to claim 1, wherein the output demanded operation amount is a driver's demand based on which the demanded drive-force relevant value is determined.

9. A control device for hybrid vehicle according to claim 1, wherein the given relationship is a relation between an accelerator opening and a demanded output torque.

10. A control device for hybrid vehicle according to claim 1, wherein setting of the motor running mode is determined based on an manipulation by a driver.

11. A control device for hybrid vehicle according to claim 10, wherein the manipulation by the driver for setting of the motor running mode is a turn-on of a motor running mode switch.

\* \* \* \* \*